(12) United States Patent
Haegele et al.

(10) Patent No.: US 12,365,144 B2
(45) Date of Patent: **\*Jul. 22, 2025**

(54) HEAT SEALING SYSTEM

(71) Applicant: Aerostar International LLC, Columbia, MD (US)

(72) Inventors: Chase Haegele, San Francisco, CA (US); Shane Fitzgibbons, Mountain View, CA (US); Raymond Gradwohl, Saratoga, CA (US); Andre Azari, San Jose, CA (US); Sampson Moore, San Jose, CA (US); Wei Li, San Jose, CA (US); Joe Benedetto, Canton, GA (US)

(73) Assignee: Aerostar International LLC, Columbia, MD (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/597,317

(22) Filed: Mar. 6, 2024

(65) Prior Publication Data

US 2024/0246300 A1    Jul. 25, 2024

Related U.S. Application Data

(63) Continuation of application No. 17/415,415, filed as application No. PCT/US2019/066584 on Dec. 16, 2019, now Pat. No. 12,103,242, which is a continuation of application No. 16/544,371, filed on Aug. 19, 2019, now abandoned.

(60) Provisional application No. 62/780,673, filed on Dec. 17, 2018.

(51) Int. Cl.
| | |
|---|---|
| *B29C 65/18* | (2006.01) |
| *B29C 65/00* | (2006.01) |
| *B29C 65/78* | (2006.01) |
| *B64B 1/58* | (2006.01) |
| *B64F 5/10* | (2017.01) |
| *B29L 22/02* | (2006.01) |

(52) U.S. Cl.
CPC .......... *B29C 65/18* (2013.01); *B29C 65/7894* (2013.01); *B29C 66/95* (2013.01); *B64B 1/58* (2013.01); *B64F 5/10* (2017.01); *B29L 2022/022* (2013.01)

(58) Field of Classification Search
CPC ..... B29C 65/18; B29C 65/7894; B29C 66/95; B64F 5/10; B64F 1/58
USPC ....................................... 156/583.1
See application file for complete search history.

(56) References Cited

U.S. PATENT DOCUMENTS 12,103,242 B2 \* 10/2024 Haegele .............. B29C 66/8223

\* cited by examiner

*Primary Examiner* — James D Sells
(74) *Attorney, Agent, or Firm* — Kim and Lahey Law Firm, LLC; Seann P. Lahey

(57) ABSTRACT

The technology relates to a heat sealing system (400). For instance, the heat sealing system may include a sealer assembly (800) including a pair of heat sealing bars (830, 840) configured to generate heat seals. The heat sealing system may also include a positioning (900) assembly including a platform (910) and a motor (952). The sealer assembly may be mounted to the positioning assembly, and the motor may be configured to move the sealer assembly towards and away from an edge of a table (1600).

20 Claims, 24 Drawing Sheets

… (1)

HEAT SEALING SYSTEM

CROSS-REFERENCES TO RELATED APPLICATIONS

The present application is a continuation of application Ser. No. 17/415,415, which is a U.S. national stage filing under 35 U.S.C. § 371 from International Application No. PCT/US2019/066584, filed on 16 Dec. 2019, and published as WO2020/131724 A1 on 25 Jun. 2020, which claims the benefit of U.S. application Ser. No. 16/544,371, filed Aug. 19, 2019, which claims the benefit of the filing date of U.S. Provisional Application No. 62/780,673 filed on Dec. 17, 2018, the disclosures of which are hereby incorporated herein by reference in their entirety.

BACKGROUND OF THE INVENTION

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various threes experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, and a plurality of tendons to support the lobes.

Typically, these components of the balloon envelope are assembled before the balloon can take flight. When this assembly technique is performed manually, the efforts can become extremely time-consuming and lack consistency.

SUMMARY OF THE INVENTION

Aspects of the present disclosure are advantageous for high altitude balloon systems. For instance, one aspect of the disclosure provide a heat sealing system including a sealer assembly including a pair of heat sealing bars configured to generate heat seals and a positioning assembly including a platform and a motor, wherein the sealer assembly is mounted to the positioning assembly, and the motor is configured to move the sealer assembly towards and away from an edge of a table.

In one example, the platform is a rotatable platform, and the motor is configured to rotate the platform by way of a shaft and a pair of pulleys. In another example, the positioning assembly includes a stage and the platform is configured to move along the stage by way of a carriage including the motor and a shaft engaged with a spiral groove of the stage. In this example, rotation of the shaft in a first direction moves the platform towards the edge of the table, and rotation of the shaft in a second direction opposite of the first direction moves the platform away from the edge of the table. In another example, the system also includes a cart on which the positioning assembly is mounted, the cart being configured to move along the edge of the table. In this example, the cart includes a plurality of wheels that allow the cart to move relative to the table and a side roller which allows the cart to maintain a relative distance from the edge of the table while the cart is moved along the edge of the table. In another example, the system also includes a cart and a cart drive assembly attached to the cart, the cart drive assembly including one or more motors configured to move the cart along the edge of the table. In this example, the cart drive assembly includes one or more wheels driven by a respective one of the one or more motors, the one or more wheels being configured to sit in a groove of a track of the table in order to move the cart along the edge of the table. In this example, the cart includes a side roller configured to maintain a relative position of the one or more wheels in the track in order to reduce wear on the one or more wheels. In addition or alternatively, one of the one or more wheels includes a rotary encoder configured to provide rotation information for the one of the one or more wheels. In this example, the system also includes a control assembly including one or more computing devices configured to receive the rotation information and determine whether a wheel of the one or more wheels is slipping. In addition or alternatively, the one or more motors are configured to control speed of the cart relative to the edge of the table as the cart is moved along the edge of the table. In addition or alternatively, the system also includes a control assembly having one or more computing devices configured to control the sealer assembly and speed of the cart. In addition or alternatively, the system also includes, a control assembly having one or more computing devices configured to control position of the platform relative to the cart and the table. Another aspect of the disclosure provides an inlet assembly having first and second pairs of rollers, each roller of the first and second pairs of rollers being configured to rotate and provide tension to envelope material entering the sealer assembly, and the first pair of rollers being configured to change an angle of material entering the sealer assembly relative to the table. In this example, the inlet assembly includes a motor configured to move the first pair of rollers towards and away from the sealer assembly in order to change the angle of the envelope material entering the sealer assembly. In another example, the system also includes a vision system including one or more sensors positioned in order to capture images of material on the table upstream from the sealer assembly. In this example, the system also includes a control assembly including one or more computing devices configured to use the images to detect problems with envelope material prior to the envelope material being heat sealed. In addition or alternatively, the vision system includes one or more sensors positioned in order to capture images of heat seals on the table downstream from the sealer assembly. In another example, the system also includes a marking system configured to use ink to mark material with identifying information, In another example, the system also includes a track and a guiderail, and a motor configured to move the positioning assembly along a length of the table.

DETAILED DESCRIPTION OF A PREFERRED EMBODIMENT

Overview

Figure 1:
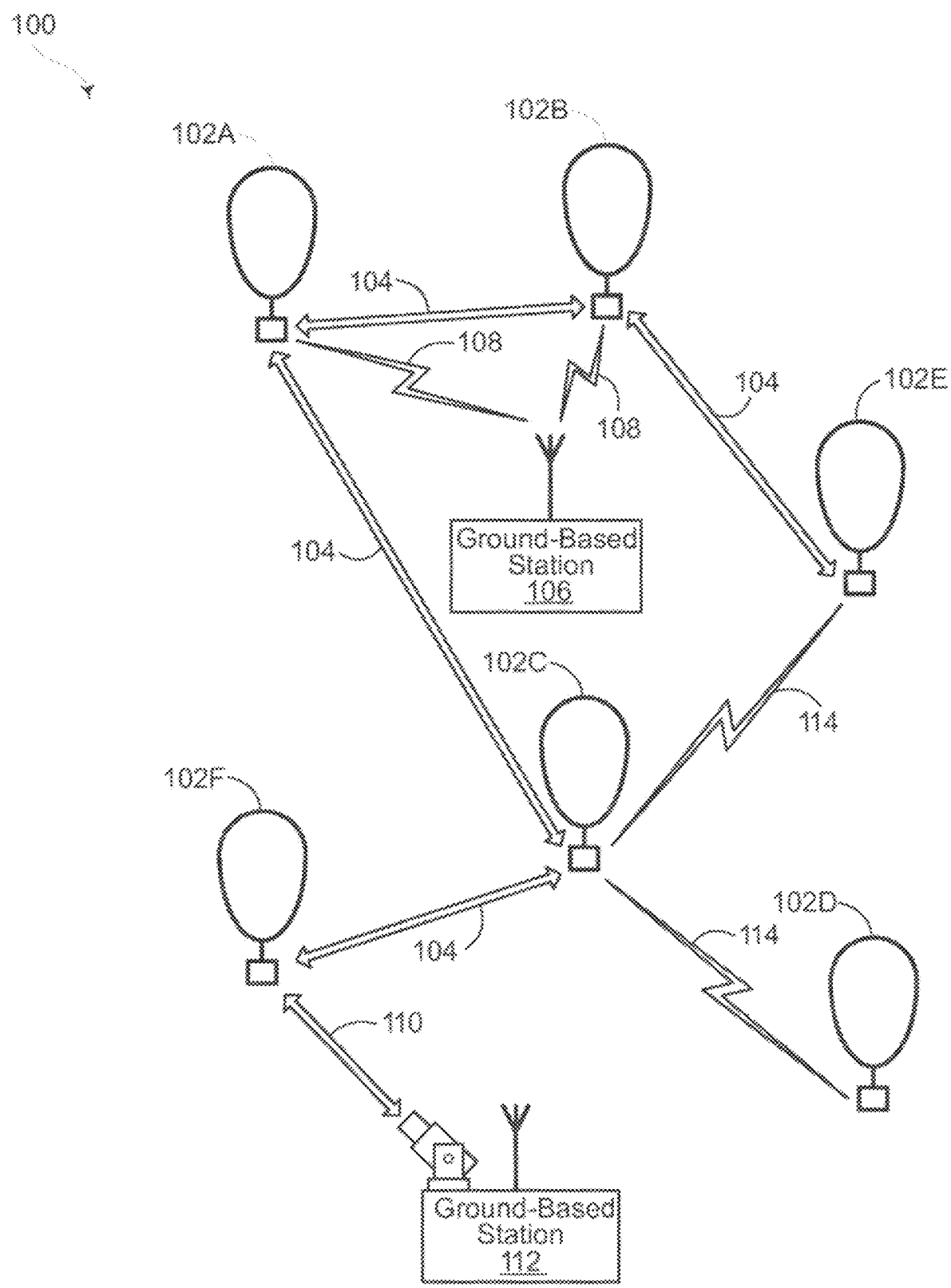
FIG. 1 is a functional diagram of a system in accordance with aspects of the present disclosure.

The present disclosure generally relates to devices for heat sealing balloon gores or lobes during balloon manufacturing. For instance, high-altitude balloons may include balloon envelopes formed from a plurality of wedge-shaped gores. These gores are heat-sealed together in a generally manual and time-consuming process. Typically, during manufacture, gores are formed according to a curvature of a table on which the heat sealing is performed. However, in some instances, it may be useful to have balloon envelopes of different shapes and sizes, or rather to have gores of different sizes and shapes, Thus, for larger balloons, such as those having gore sections that are tens of meters long, different shapes and sizes for gores would require different table shapes. To avoid the need for different table shapes and configurations, a specialized heat sealing system, which can also provide additional quality control measures, may be used.

An example heat sealing system may include a sealer system, a positioning assembly, a control assembly, a vision system, a marking system, and a table. The sealing system includes an inlet assembly, a sealer assembly, and an outlet assembly. The inlet assembly may include two pairs of nip rollers and may control speed, angle, and tension of material going into the sealer assembly. The outlet assembly may also include a pair of nip roller and a rotary cutting blade to provide tension and remove excess material, respectively.

The sealer assembly includes an upper portion and a lower portion. The upper portion and lower portions can be opened and closed relative to one another. The upper portion includes a first pair of belt-driven rollers with an attached motor as well as heat sealing and cooling bars. The lower portion includes a second pair of belt-driven rollers with an attached motor. The first pair of rollers provide pressure from the top down against the second pair of rollers which provide pressure from the bottom up as well as heat sealing and cooling bars. Together the corresponding pairs of rollers pull balloon envelope material through the sealer assembly. Each of the heat sealing bars and cooling bars can therefore be pressed together such that corresponding bars make contact with one another with a desired force.

The control assembly may include one or more computing devices having one or more processors and memory storing data and instructions. The control assembly may be configured to control various aspects of the heat sealing system, such as the speed and movement of the various motors. This, in turn, may allow the control assembly to control how the heat sealing system heat seals pieces of material. As the scaling assembly moves along the table, the control assembly may control the position of the linear stage to move the platform towards and away from the table.

The heat sealing system may also include a vision system which may provide for data collection ahead of the intake assembly and to record the heat seals behind the cart as the cart moves along the table. The heat sealing system may also include a marking system configured to mark the heat sealed material with information.

The features described herein may allow for a more consistent process for manufacturing balloon envelope gores. In addition, because the sealer assembly is able to be moved relative to the table, the shape of balloon envelope gores is no longer limited to the shape of the table or the inconsistencies of manual heat sealing processes. This can improve film tension during sealing and quality of the final balloon envelope. In addition, the use of a vision system to monitor tension and seal quality may provide data which can be used to improve seal quality and identify potential causes of balloon envelope failures related to manufacturing conditions.

Example System

FIG. 1 depicts an example system 100 in which an aircraft as described above may be used. This example should not be considered as limiting the scope of the disclosure or usefulness of the features of the present disclosure. For example, the techniques described herein can be employed on various types of aircraft and systems. In this example, system 100 may be considered a "balloon network" though in addition to balloons the network may include other types of aircraft including other airships, etc. As such, the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
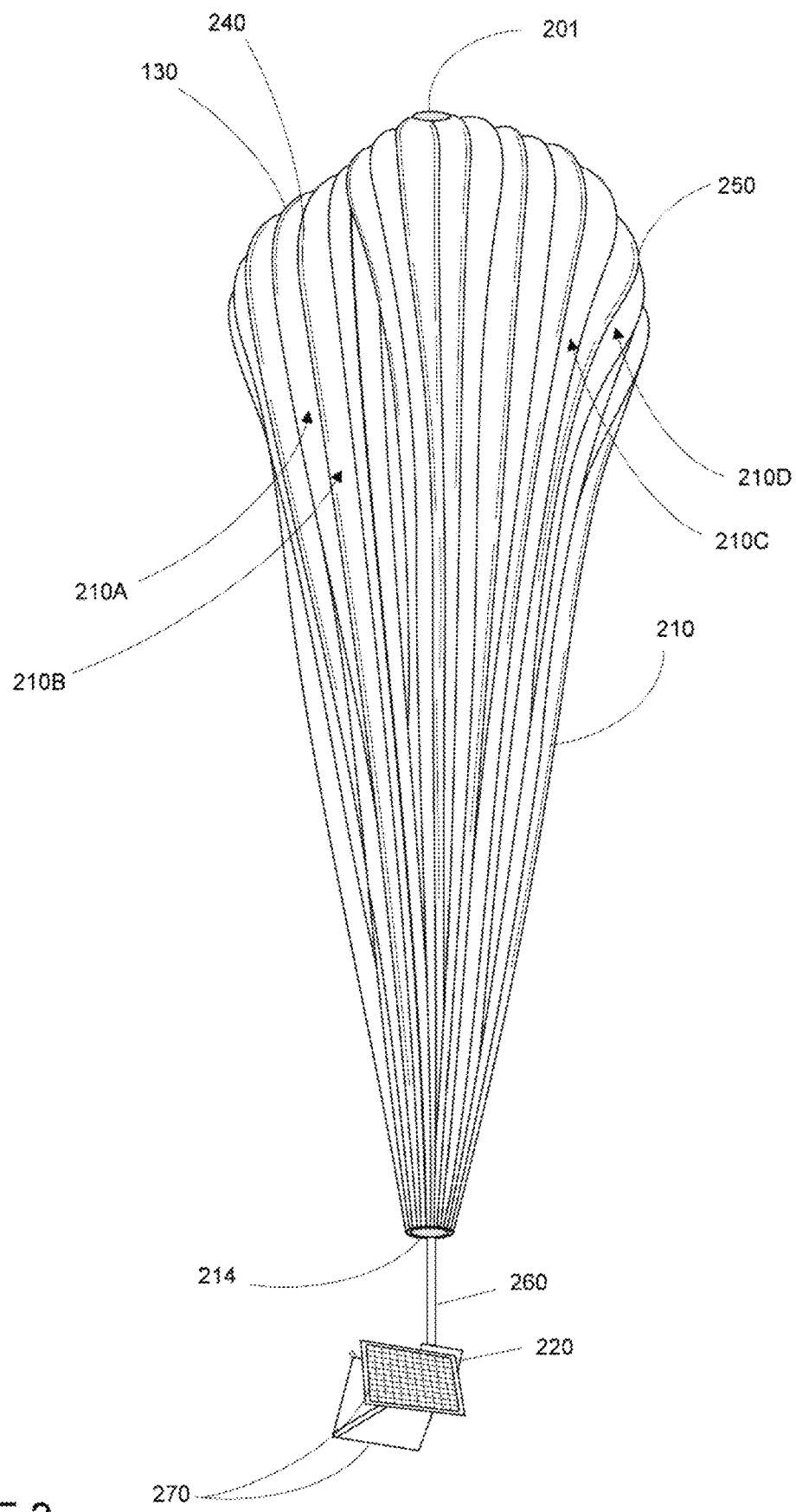
FIG. 2 is an example of a balloon in accordance with aspects of the present disclosure.

FIG. 2 is an example balloon 200, which may represent any of the balloons of the system 100. As shown, the balloon 200 includes an envelope 210, a payload 220 and a plurality of tendons 230, 240 and 250 attached to the envelope 210. The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage (similar to processors 1320 and memory 1330 described below). The payload 220 may also include various other types of equipment and systems (not shown) to provide a number of different functions. For example, the payload 220 may include various communication systems such as optical and/or RF, a navigation system, a positioning assembly, a lighting system, an altitude control assembly (configured to change an altitude of the balloon), a plurality of solar panels 270 for generating power, a power supply (such as one or more batteries) to store and supply power to various components of balloon 200.

In view of the goal of making the balloon envelope 210 as lightweight as possible, it may be comprised of a plurality of envelope lobes or gores that have a thin film, made of a material such as polyethylene or polyethylene terephthalate, which is lightweight, yet has suitable strength properties for use as a balloon envelope (hereafter, envelope material). In this example, balloon envelope 210 is comprised of envelope gores 210A-210D.

Pressurized lift gas within the balloon envelope 210 may cause a force or load to be applied to the balloon 200. In that regard, the tendons 230, 240, 250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. A corresponding apparatus, e.g., bottom cap 214, may be disposed at a base or bottom of the balloon envelope 210. The top cap 201 at the apex may be the same size and shape as and bottom cap 214 at the bottom. Both caps include corresponding components for attaching the tendons 230, 240 and 250 to the balloon envelope 210.

Figure 3:
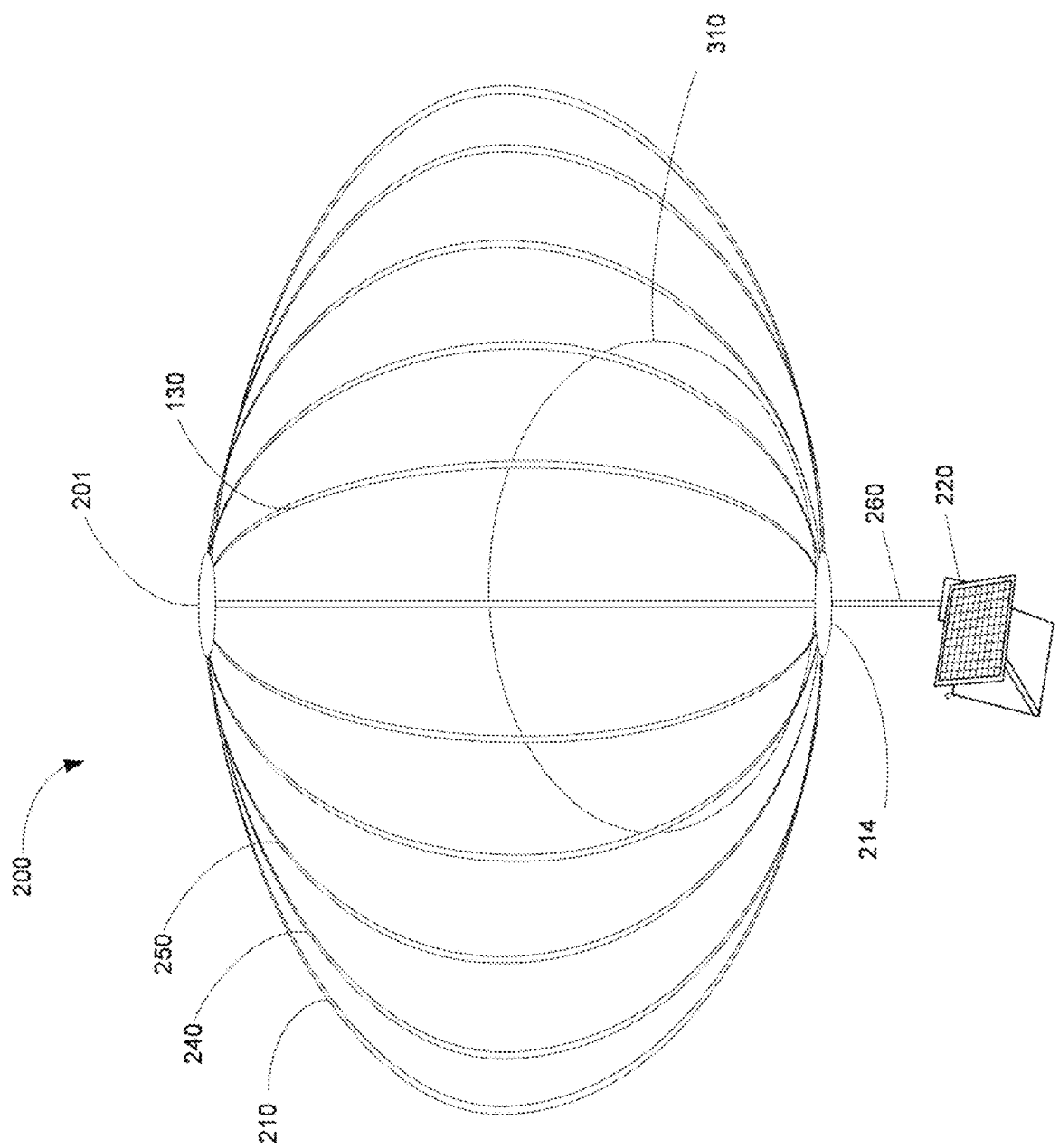
FIG. 3 is an example of a balloon in flight in accordance with aspects of the. disclosure.

FIG. 3 is an example of balloon 200 in flight. In this example, the shapes and sizes of the balloon envelope 210, connection 260, ballast 310, and payload 220 are exaggerated for clarity and ease of understanding. During flight, these balloons may use changes in altitude to achieve navigational direction changes. For example, the altitude control assembly of the payload 220 may cause air to be pumped into the ballast 310 within the balloon envelope 210 which increases the mass of the balloon and causes the balloon to descend. Similarly, the altitude control assembly may cause air to be released from the ballast 310 (and expelled from the balloon) in order to reduce the mass of the balloon and cause the balloon to ascend.

Example Heat Sealing System

Figure 4B:
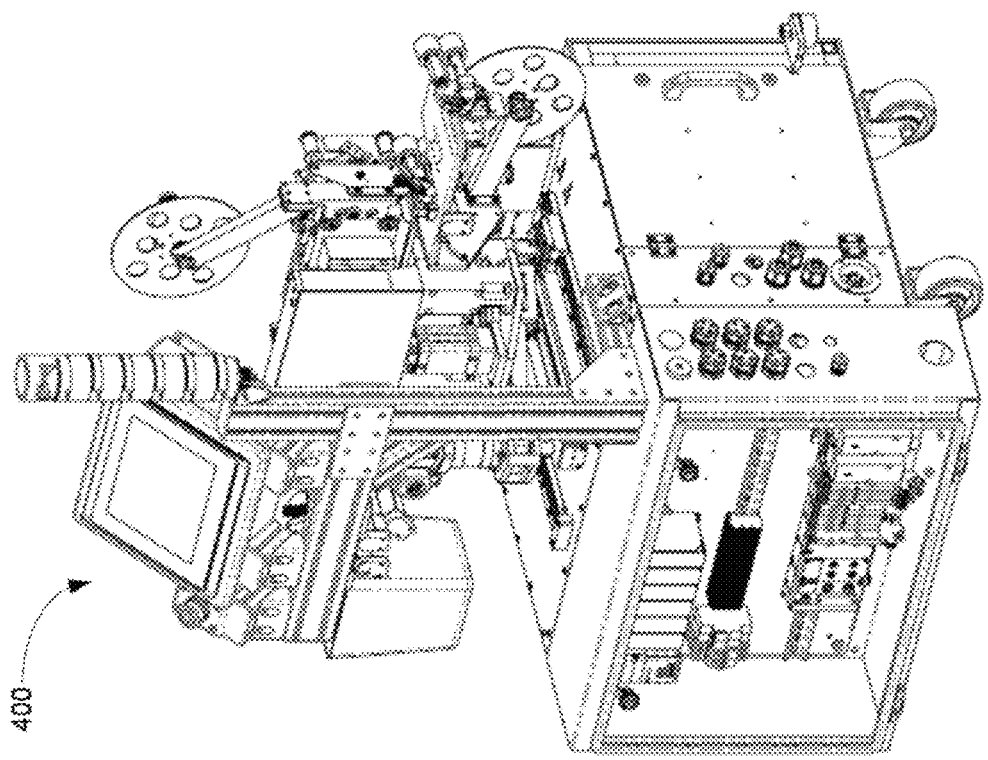
FIGS. 4A-4E are example views of aspects of a heat sealing system in accordance with aspects of the disclosure.
Figure 4A:
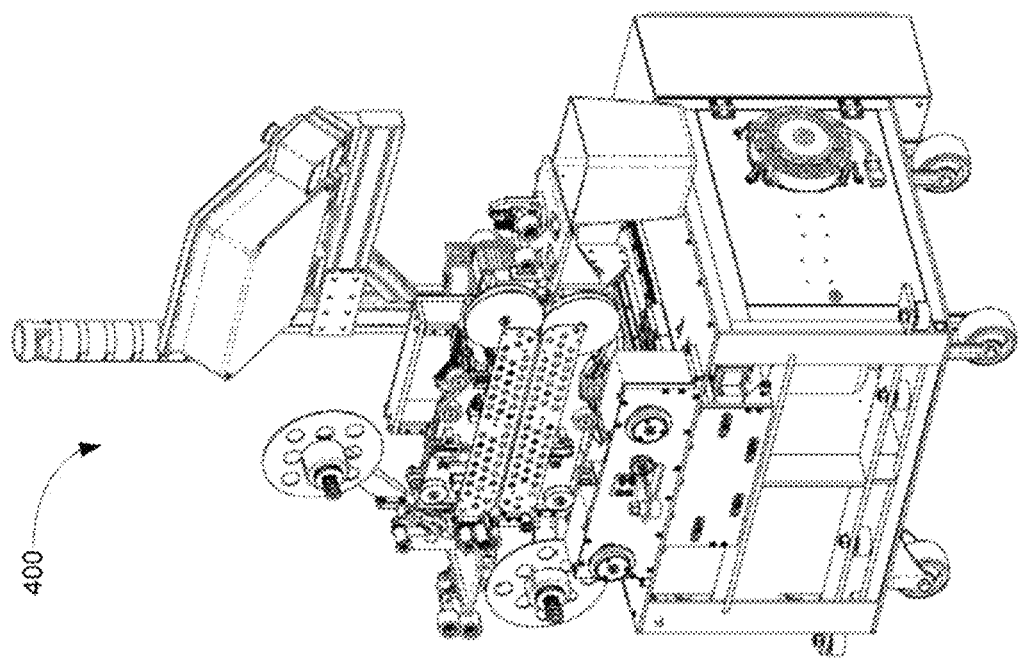
Figure 4D:
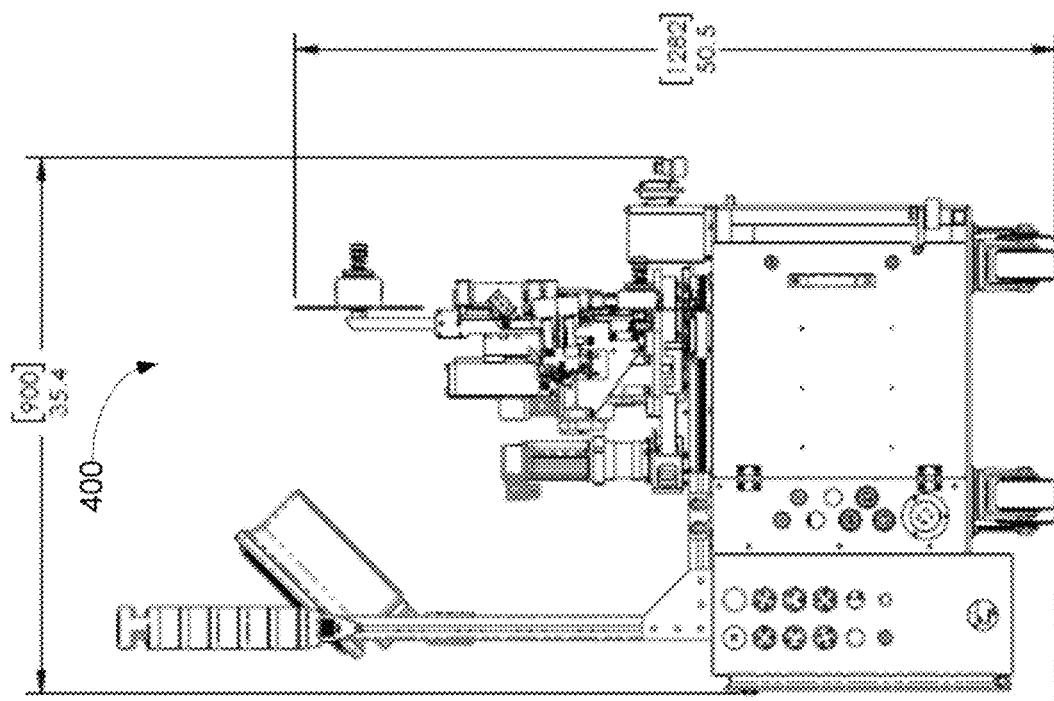
Figure 4C:
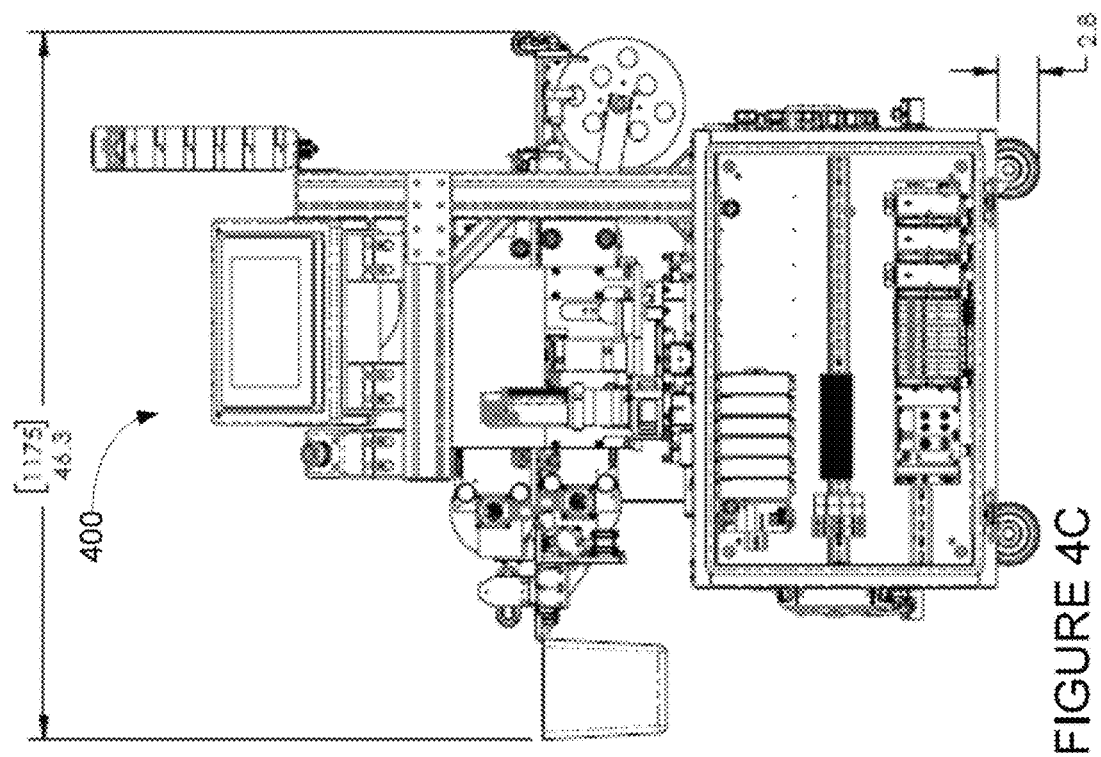
Figure 4E:
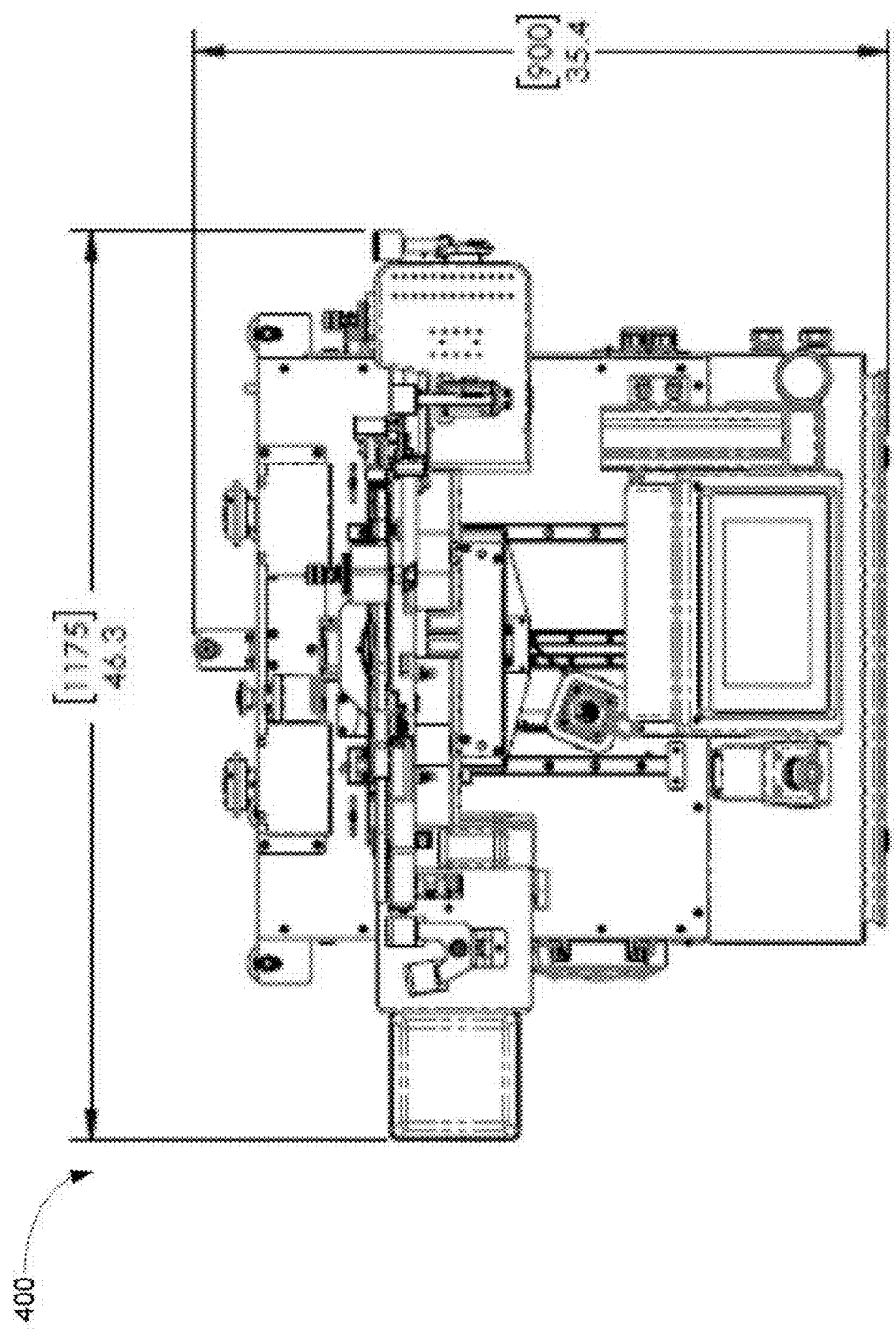
Figure 5:
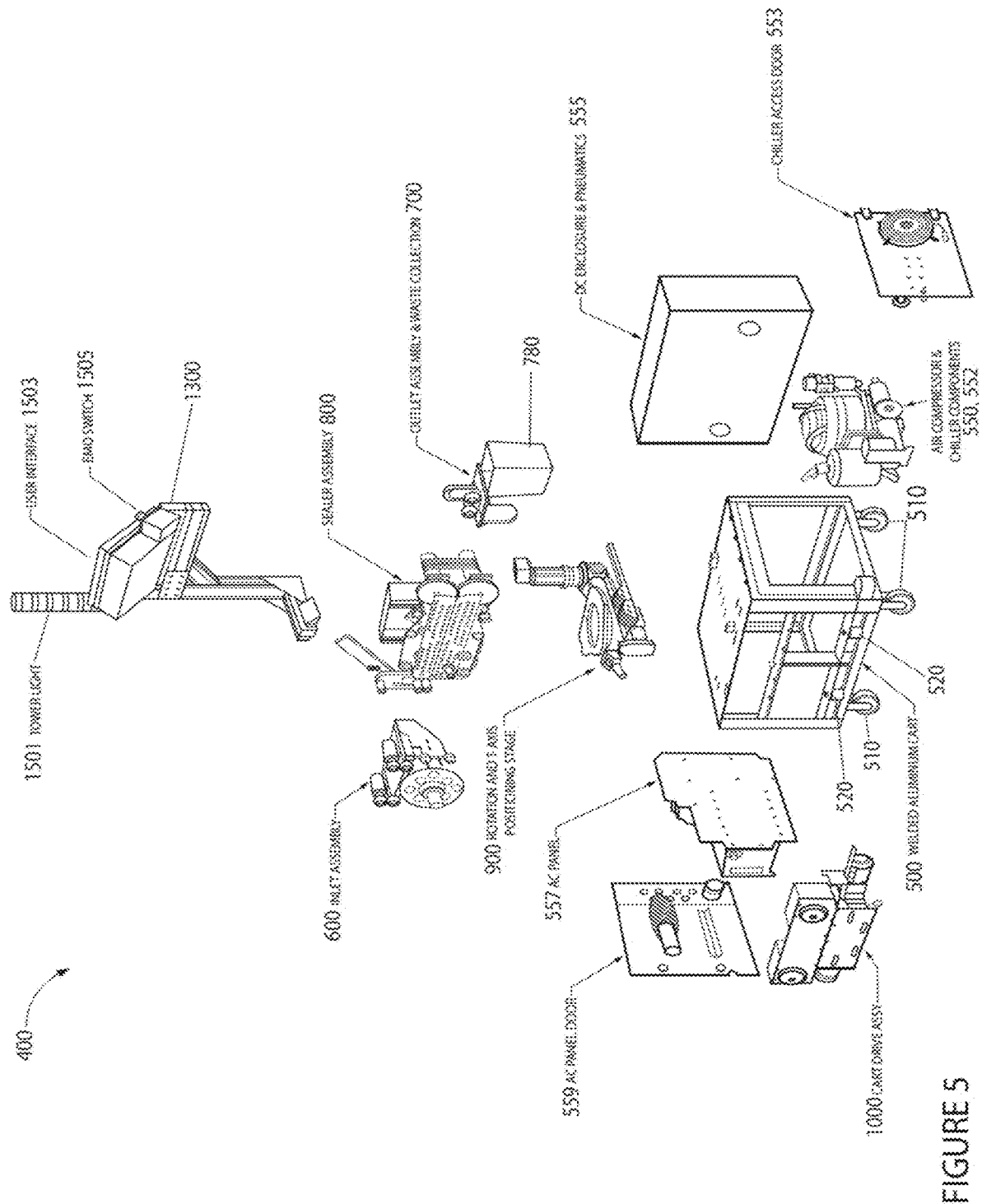
FIG. 5 is an example exploded view of aspects of a heat sealing system in accordance with aspects of the disclosure.
Figure 14:
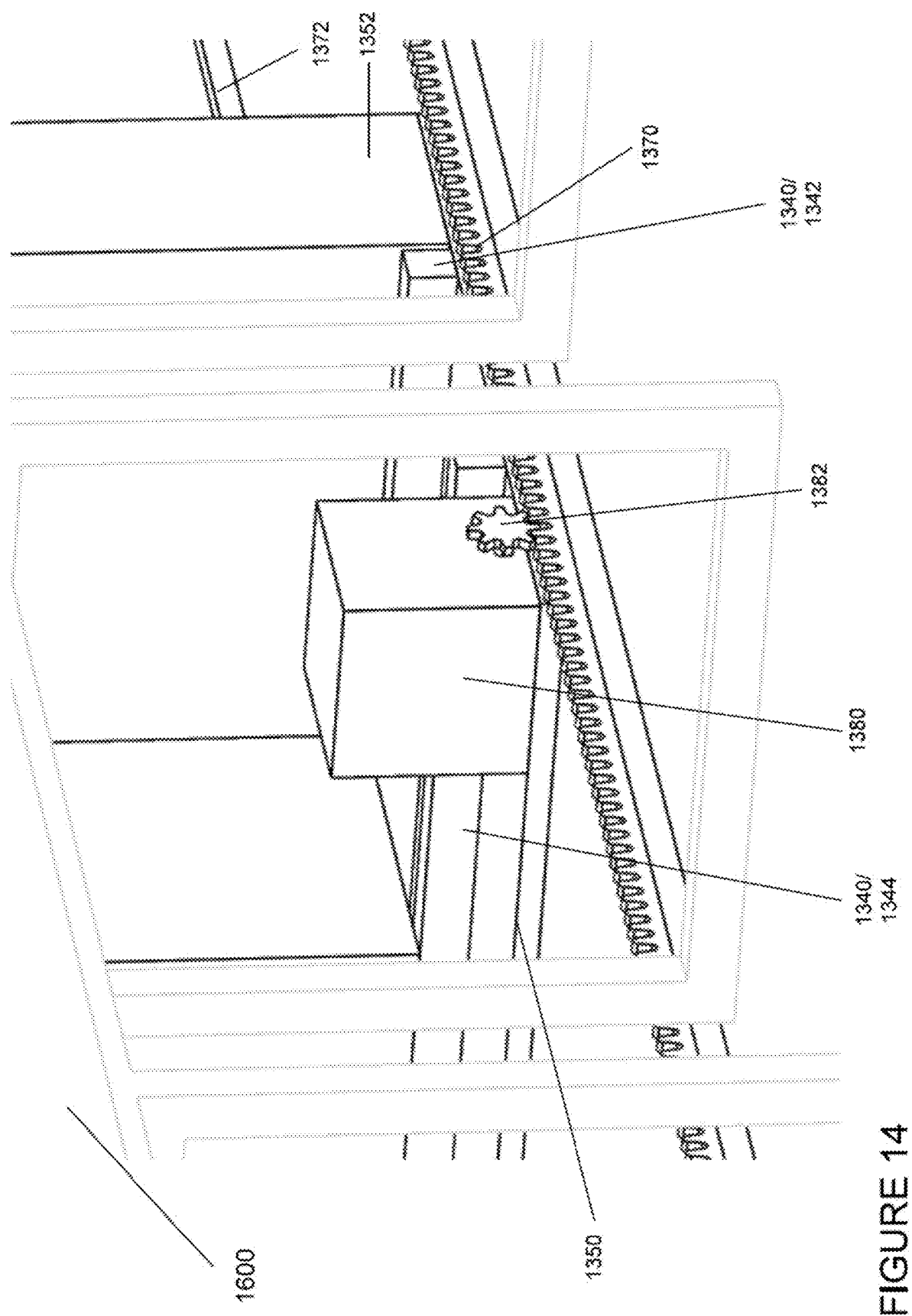
FIG. 14 is an example view of aspects of a heat sealing system in accordance with aspects of the disclosure.

FIGS. 4A-4D provide side views of aspects of an example heat sealing system 400, FIG. 4E is a top-down view, and FIG. 5 is an exploded view. The heat sealing system may include a sealer system, a positioning assembly, a cart, a cart drive assembly, a control assembly, a vision system, and a marking system described in more detail below. The heat sealing system 400 may also include a table 1600 depicted in FIG. 14.

Figure 6B:
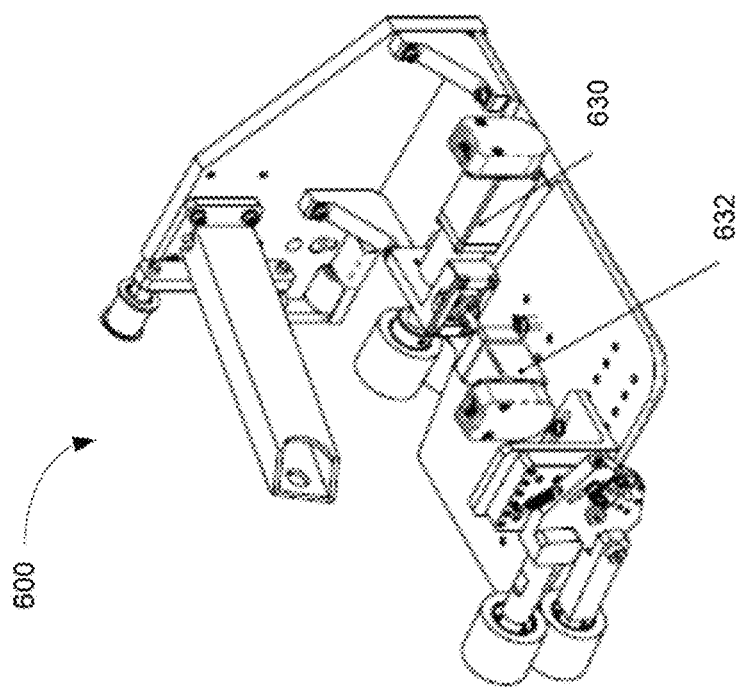
FIGS. 6A-6B are example views of an inlet assembly in accordance with aspects of the disclosure.
Figure 6A:
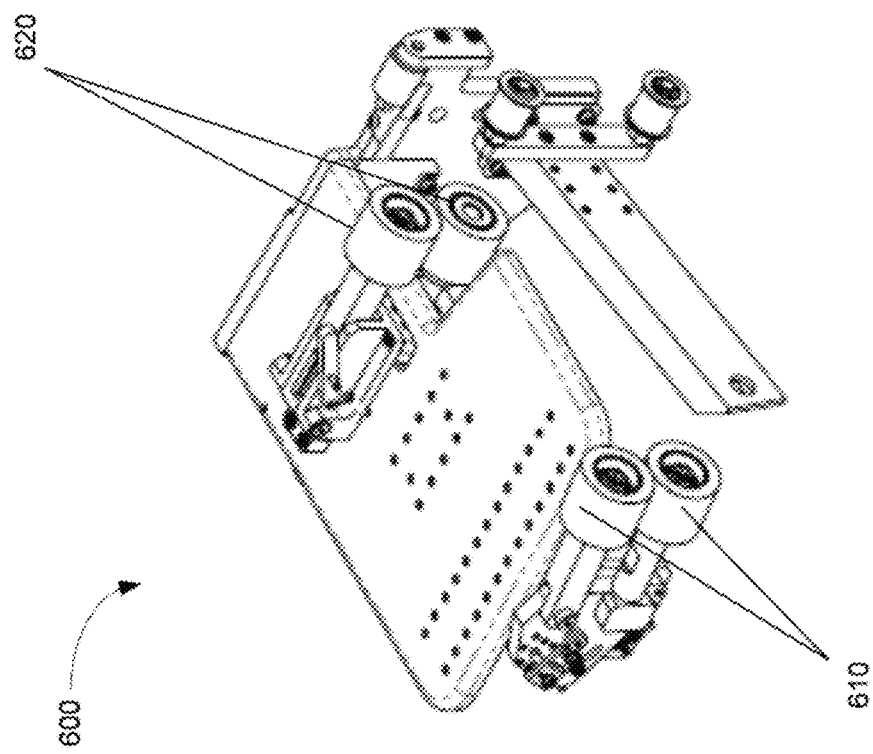

The sealing system includes an inlet assembly 600 (shown in FIGS. 6A-6B, an outlet assembly 700 (shown in FIGS. 7A and 7B), and a sealer assembly 800 (shown in FIGS. 8A-8E). Turning to FIG. 6, the inlet assembly includes two pairs of nip rollers 610, 620. The pairs of nip rollers may be configured to pull balloon envelope material into the sealer assembly 700. Each of the pairs of nip rollers may be driven by a motor 630. Motor 630 may be a small electric motor or any motor configured to control the rotation of the nip rollers 620. A second motor, motor 632 may be configured to change the position of one of the pairs of nip rollers 620. For instance, motor 632 may be configured to change the angle of the nip rollers relative to the inlet assembly, allowing these nip rollers to move towards and away from the sealer assembly. The motor 632 may be a lead screw motor.

These pairs of nip rollers 610, 620 may allow the sealing system to control the tension, and to some extent the speed, of the envelope material as the envelope material moves through the sealer assembly 800. The pairs of nip roller may also allow the heat sealing system to control the angle at which material enters the sealer assembly relative to the table 1600 on which the envelope material is placed. While a single pair of nip rollers may be sufficient to control speed and angle, having a second pair of nip rollers at the inlet assembly 600, may allow for more consistent tensioning arid reduces folding and bunching of material entering the heat sealer assembly which can be problematic, especially when the envelope material is only a few millimeters thick.

Figure 7B:
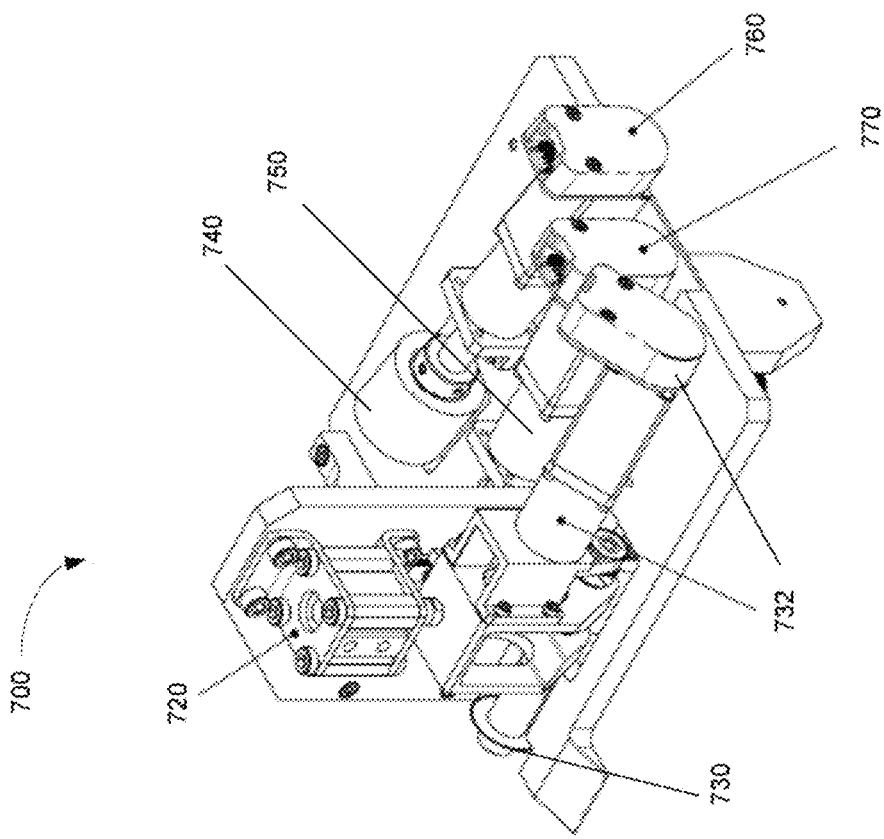
FIGS. 7A-7B are example views of an outlet assembly in accordance with aspects of the disclosure.
Figure 7A:
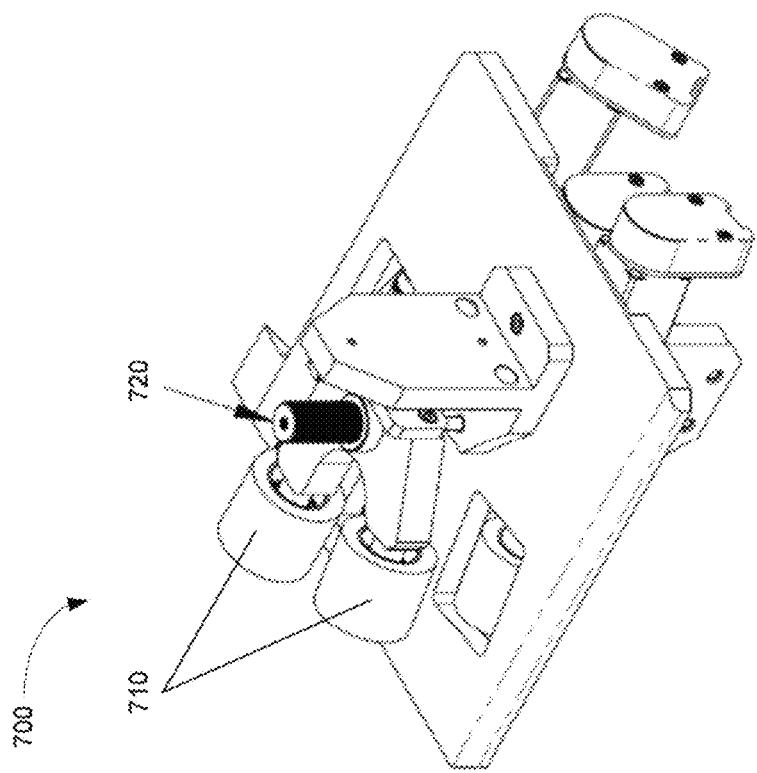

Turning to FIGS. 7A and 7B, the outlet assembly 700 also includes a pair of nip rollers 710 configured to pull sealed envelope material away from the sealer assembly 700. This pair of nip rollers may also provide consistent tension in the envelope material and can be actuated by a pneumatic actuator 720 which may be activated, for instance, via an air compressor 550 (shown in FIG. 5). Returning to FIGS. 7A and 7B, adjacent to the pair of nip rollers is a rotary cutting blade 730 driven by a motor 732. In this regard, the rotary cutting blade is configured to cut excess material (if needed) and first and second rollers 740, 750 driven by motors 760, 770, respectively, are configured to pull excess envelope material into a waste receptacle 780 (shown in FIG. 5). Motor 732, 760, 770 may be small electric motors or any motors configured to control the rotation of the rotary cutting blade and rollers 740, 750, respectively.

Turning to FIGS. 8A-8E, the sealer assembly 800 includes an upper portion 810 and a lower portion 850. The upper portion and lower portions can be opened and closed relative to one another, for instance, via a linear actuator 802. The linear actuator may include, for example, an air cylinder to facilitate the opening and allow the closing of the upper and lower portions. As such, the sealer system is able to be positioned at any point on the envelope material when the upper portion 810 and lower portion 850 are opened, and once closed, heat sealing can begin. This, in turn, allow the sealing system to be stopped at any point along a seal and moved, forward or backward, in the event of problems with positioning, folding, bunching, and/or tension in the envelope material.

Figure 8A:
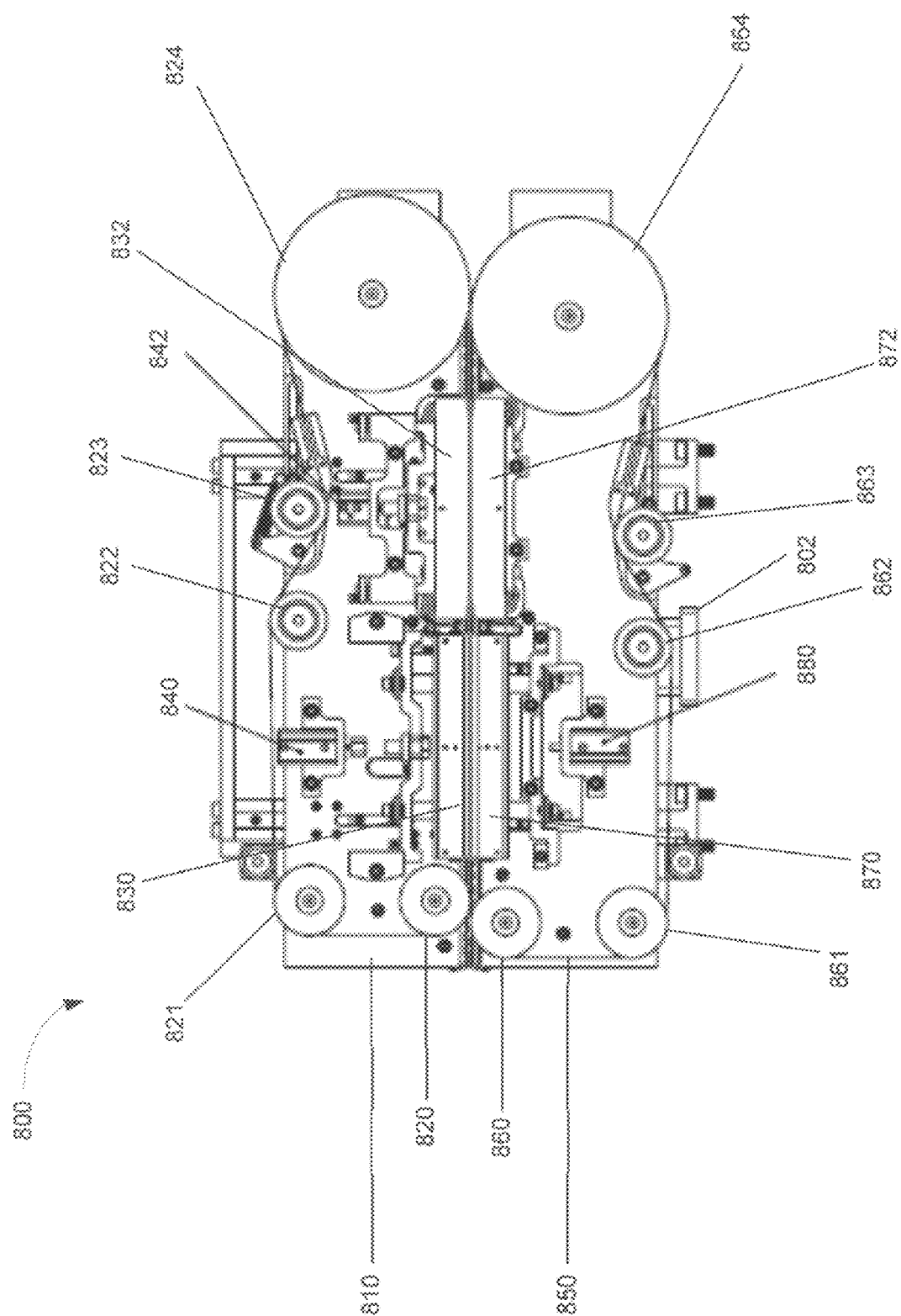
FIGS. 8A-8E are example views of a sealer assembly in accordance with aspects of the disclosure.
Figure 8B:
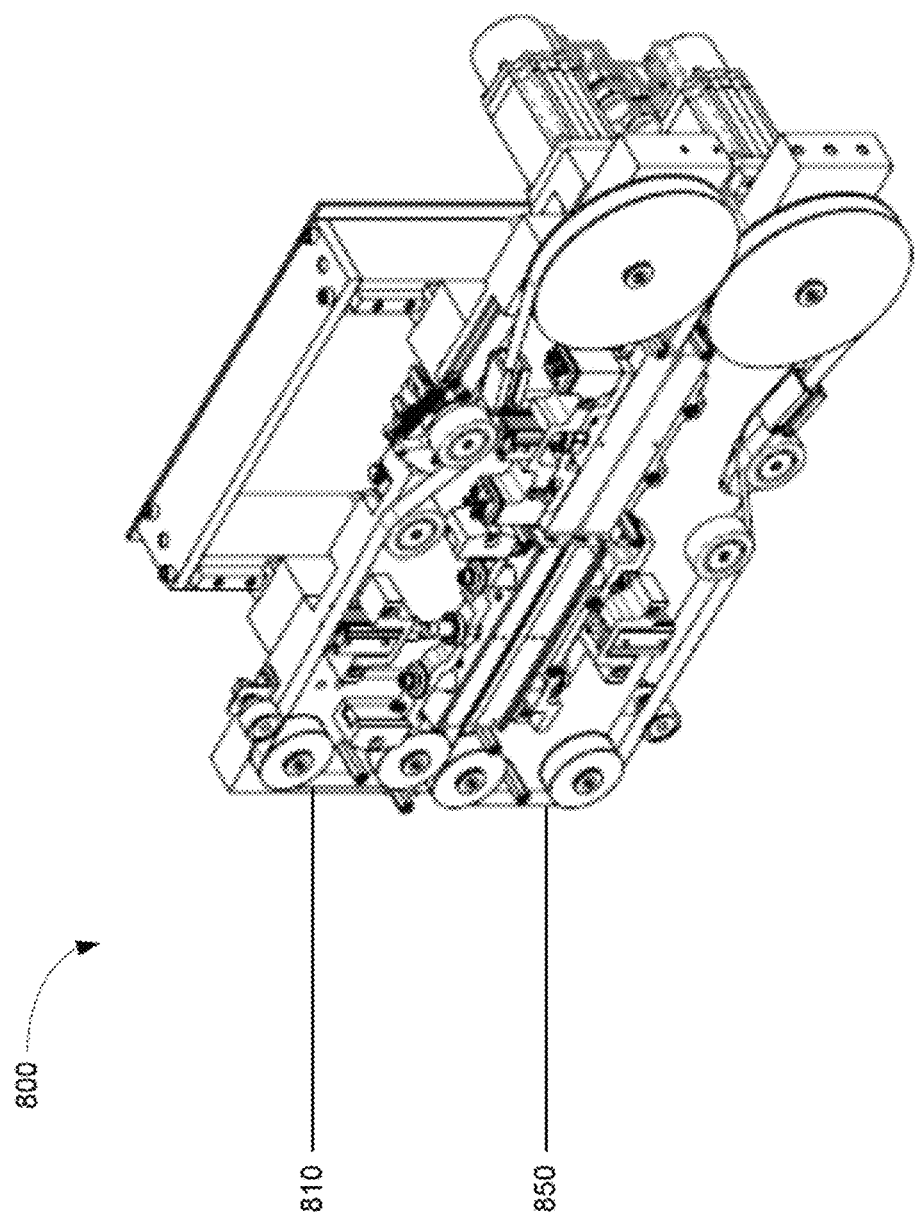
Figure 8C:
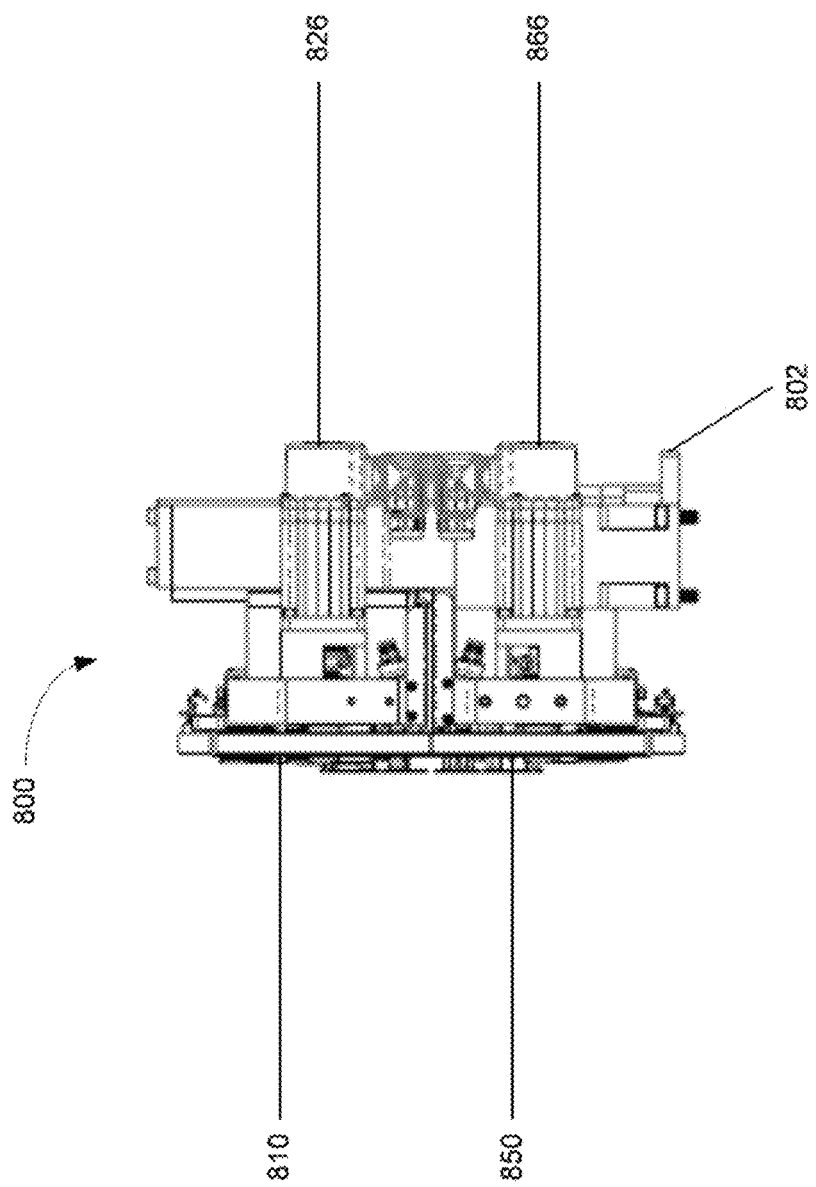
Figure 8E:
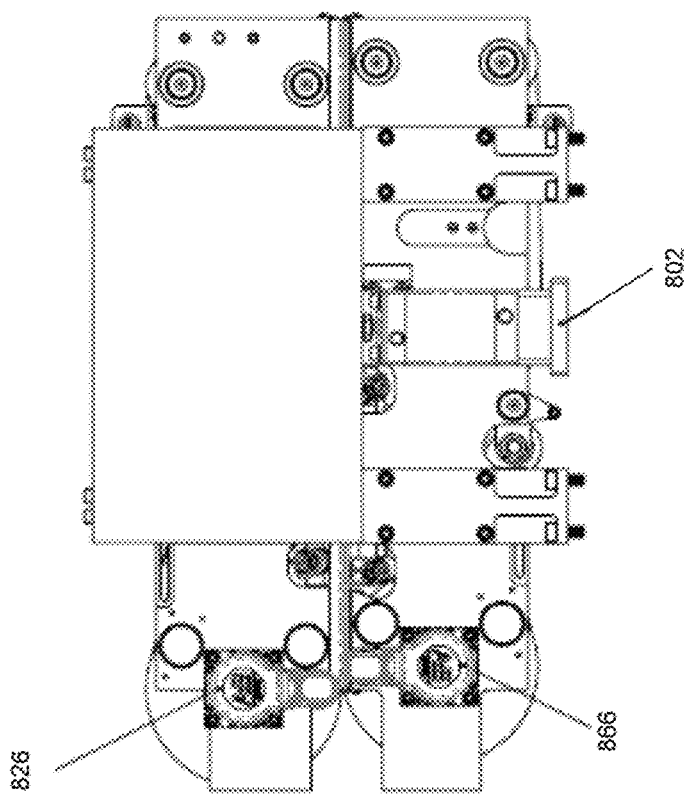
Figure 8D:
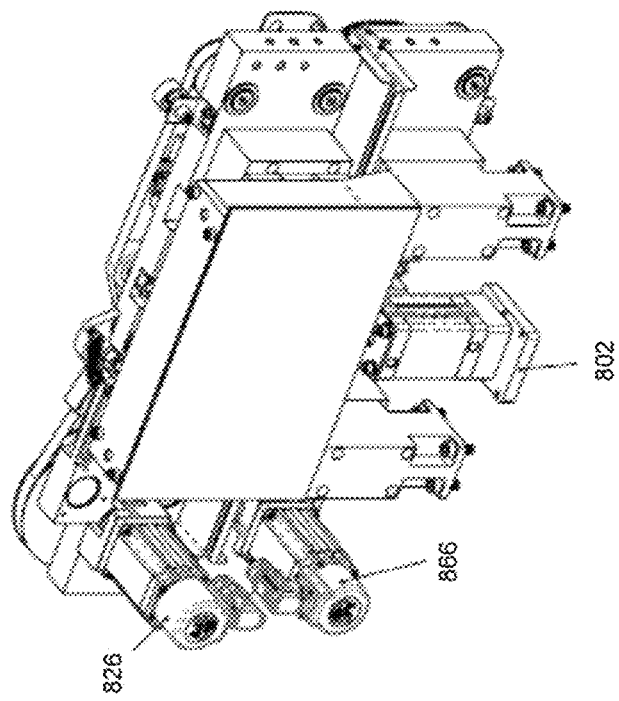

The upper portion 810 includes a first set of rollers 820-824 with an attached motor 826 (shown in FIGS. 80 and 8E). The lower portion includes a second set of rollers 860-864 with an attached motor 866 (shown in FIGS. 8D and 8E). The motors 826, 866 may be small electric motors or any motors configured to control the rotation of the first and second sets of rollers for instance, using a belt-drive. Together these corresponding pairs of rollers may be configured to pull envelope material through the sealer assembly 800.

The upper portion also includes a first heat sealing plate or bar 830 and a first cooling plate or bar 832, and the lower portion includes a second heat sealing plate or bar 870 and a second cooling plate or bar 872. The first and second heat sealing bars are aligned with one another when the sealer assembly is in the closed position (shown in FIGS. 8A-8E). The first heat sealing bar is attached to a first linear actuator 840, for example an air cylinder, which can drive, for instance using a pneumatic actuator or a screw drive, the heat sealing bar towards and away from the second heat sealing bar when the sealer assembly is in the closed position. The second heat sealing bar is attached to a second linear actuator 880, for example an air cylinder, which can drive, for instance using a pneumatic actuator or a, screw drive, the heat sealing bar towards and away from the first heat sealing bar when the sealer assembly is in the closed position.

The first and second cooling bars are also aligned with one another when the sealer assembly is in the closed position (shown in the figures). In addition, the first cooling bar 832 is attached to a third linear actuator 842, for example an air cylinder, which can drive, for instance using a pneumatic actuator or a screw drive, the heat sealing bar towards and away from the first heat sealing bar when the sealer assembly is in the closed position. Each of the first and second heat sealing bars and cooling bars may also include various sensors, including for instance, a thermometer (not shown) to measure the temperature and make adjustments as needed.

Each of the first and second heat sealing bars 830, 870 and the first and second cooling bars 832, 872 can therefore be pressed together such that corresponding bars make contact with one another with a desired force. During operation, the first and second heat sealing bars 830, 870 may remain fixed relative to one another, and the envelope material may be pulled (for instance, via the various rollers) into the sealing assembling 800. As the envelope material is moved between the first and second heat sealing bars 830, 870, the first and second heat sealing bars may then create a heat seal in the envelope material.

When closing the upper and lower portions, the second heat sealing bar plate 870 may be moved towards the first heat sealing bar plate 830 and vice versa via linear actuators 802, 840, 880. When opening the upper and lower portions, the first and second heat sealing bars may then be moved away from one another, the second heat sealing bar plate 870 may be moved towards the first heat sealing bar plate 830 and vice versa via linear actuators 802, 840, 880, In this regard, if the heat sealer needs to be stopped and/or the material adjusted, the upper and lower portions can be easily opened.

Rather than being fixed during sealing (i.e. when the upper and lower portions are closed), the first cooling bar may simply be "loose" or free floating such that very little pressure is applied against the second cooling bar. As such, the envelope material can simply be "slide" between the first and second cooling bars. The cooling bars may also be liquid cooled and thereby provide instant cooling as heated balloon envelope material is positioned between the cooling bars. This configuration with cooling bars adjacent to the heating bars also allows one portion of material to be heat sealed while an adjacent portion of material having a heat seal is cooled.

Figure 9B:
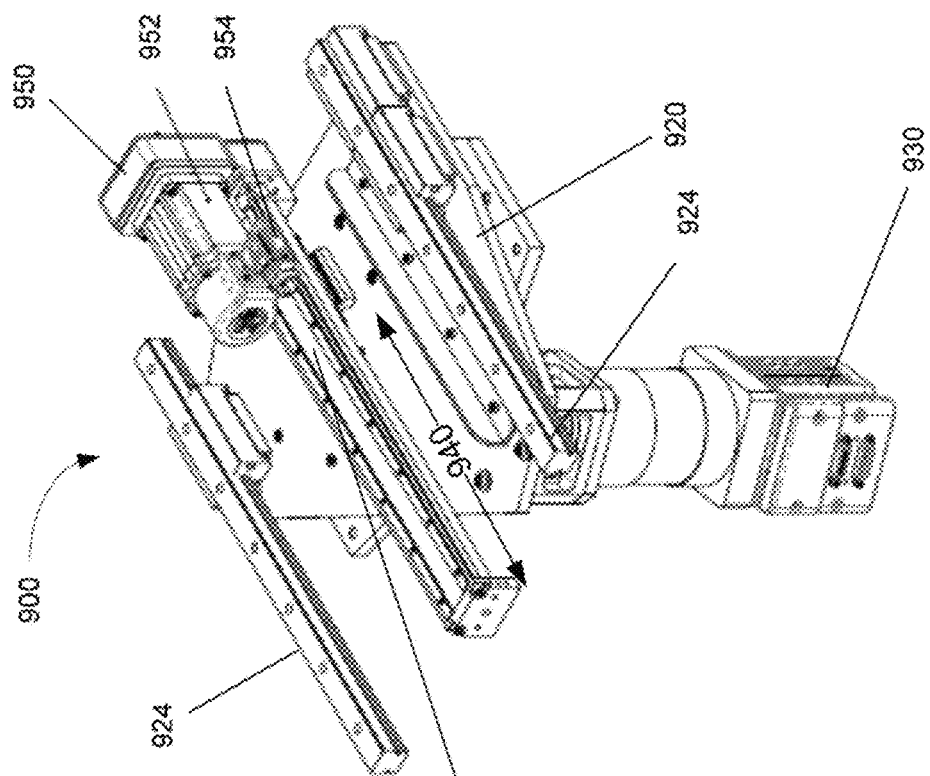
FIGS. 9A-9B are example views of a positioning assembly in accordance with aspects of the disclosure.
Figure 9A:
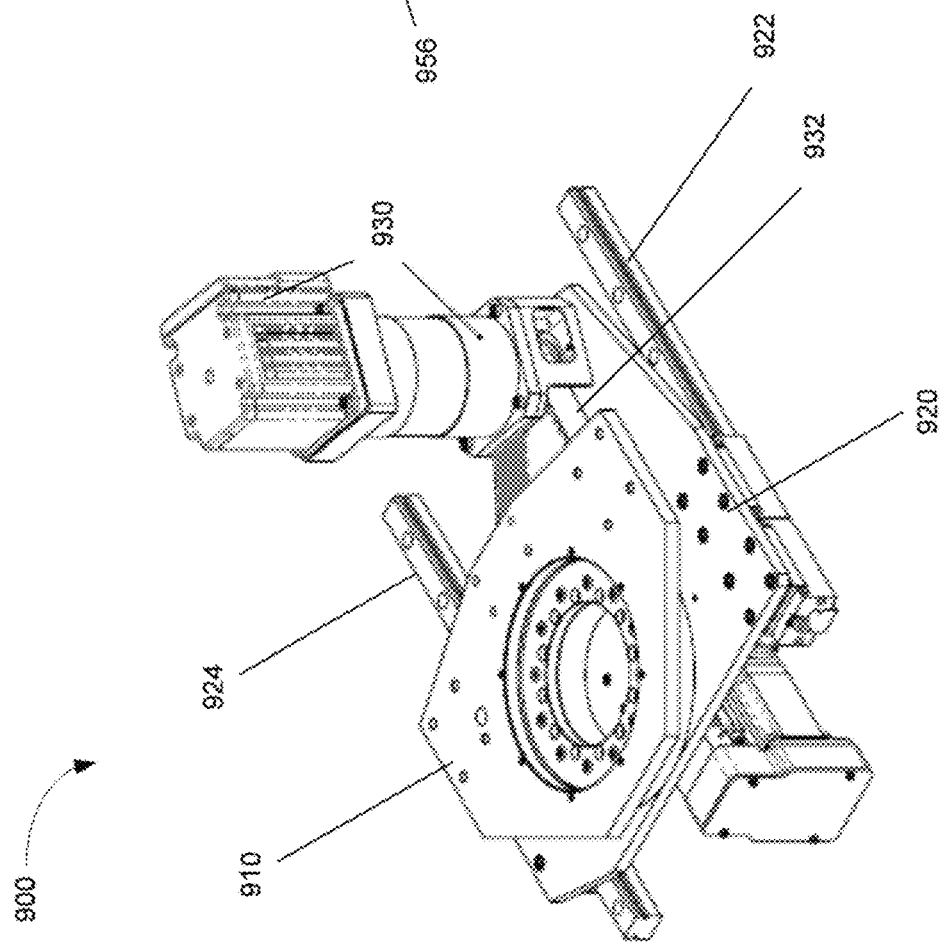

Turning to FIGS. 9A and 9B, the sealer assembly may be mounted to a positioning assembly 900. The positioning assembly includes a rotatable platform 910 mounted on a linear stage 920 including a pair of rails 922, 924. The platform may be rotatable relative to the cart via a motor 930 having a shaft (not shown) which rotates a belt 932 via a first pulley (not shown). The belt may move around a second pulley (not shown) of the platform 910 causing the pulley of the platform and the platform to rotate. In addition, the platform may be configured to move along the rails 922, 924 of the linear stage in two directions, for instance, forward and reverse along the rails as indicated by arrow 940. The movement of the platform is driven by carriage 950 including a motor 952 having a shaft 954 engaged with a spiral groove 956 of the linear stage. Rotation of the shaft in a clockwise direction moves the platform along the rails in the first direction, and rotation of the shaft in a counterclockwise direction moves the platform along the rails in the second direction opposite of the first direction.

Returning to FIG. 5, the positioning assembly is mounted to a cart 500. As such the cart is configured to support the sealer assembly and the positioning assembly as well as the cart drive assembly and various other systems of the heat sealer assembly, including for instance, the air compressor 550 (for activating the various pneumatic features described herein) and chiller components 552 (for cooling the first and second cooling bars 832, 872), a chiller access door 553, DC enclosure and pneumatics 555, an AC panel 557, an AC panel door 559. A control assembly 1500 is mounted to cart 500. In the illustrated embodiment of FIG. 5, the control assembly also includes a tower light 1501, user interface 1503 and EMO switch 1505. The cart may thus be comprised of aluminum and/or other metals. In addition, the cart includes a plurality of wheels 510 that allow the cart to move relative to a table. The cart also includes one or more side rollers 520 (also shown in FIG. 12), which allows the cart to maintain a relative distance from an edge of the table 1600 and glide along the table. The side rollers 520 may also provide support for the cart relative to the table by keeping the cart and the wheels of the cart drive assembly (discussed below) more level and thereby preventing damage and excess wear on the wheels of the cart drive assembly.

Figure 10B:
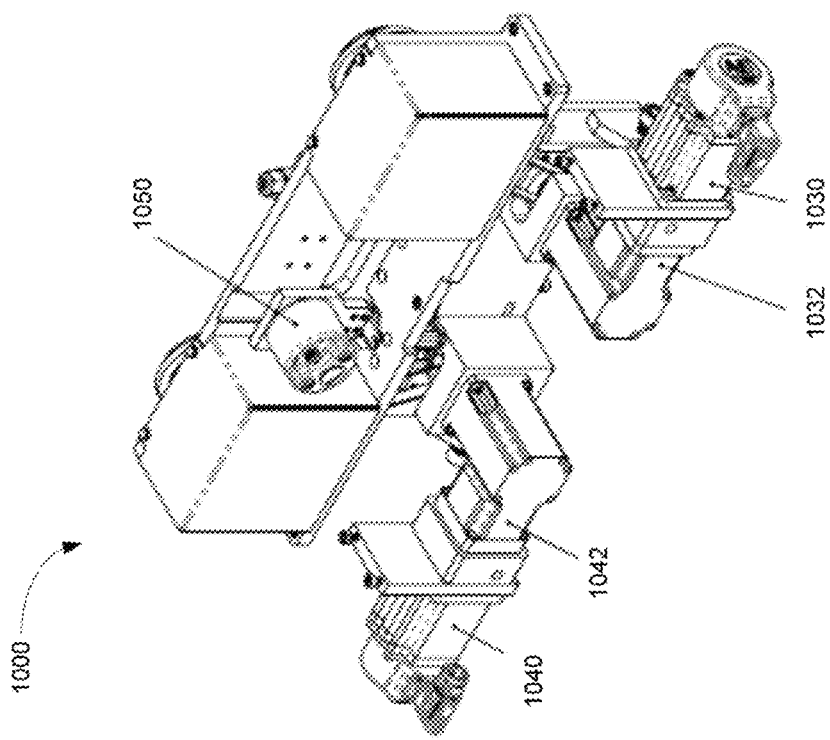
FIGS. 10A-10C are example views of a cart drive assembly in accordance with aspects of the disclosure.
Figure 10A:
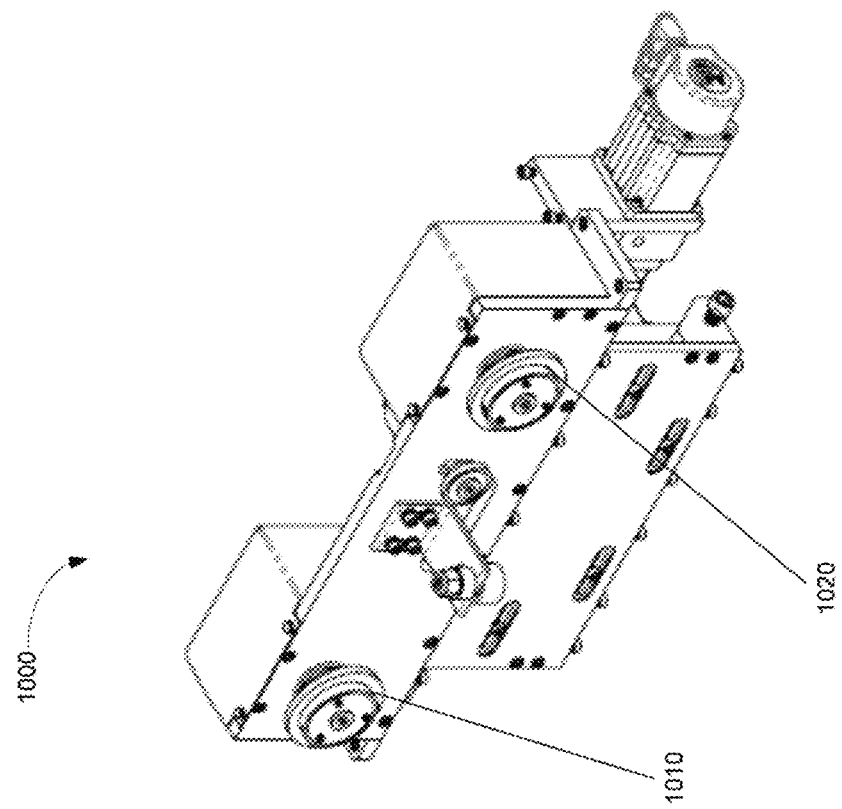
Figure 10C:
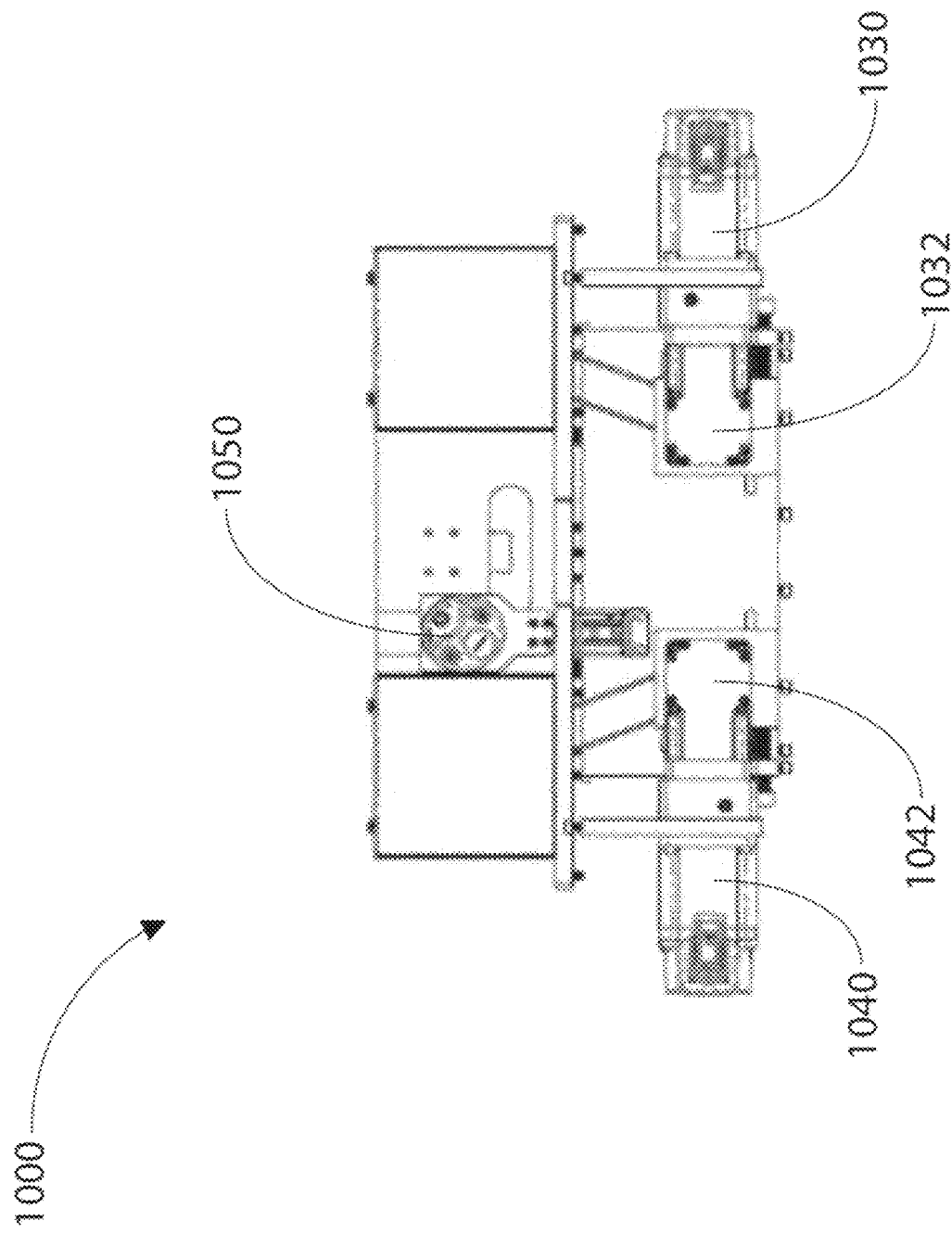
Figures 11, 12:
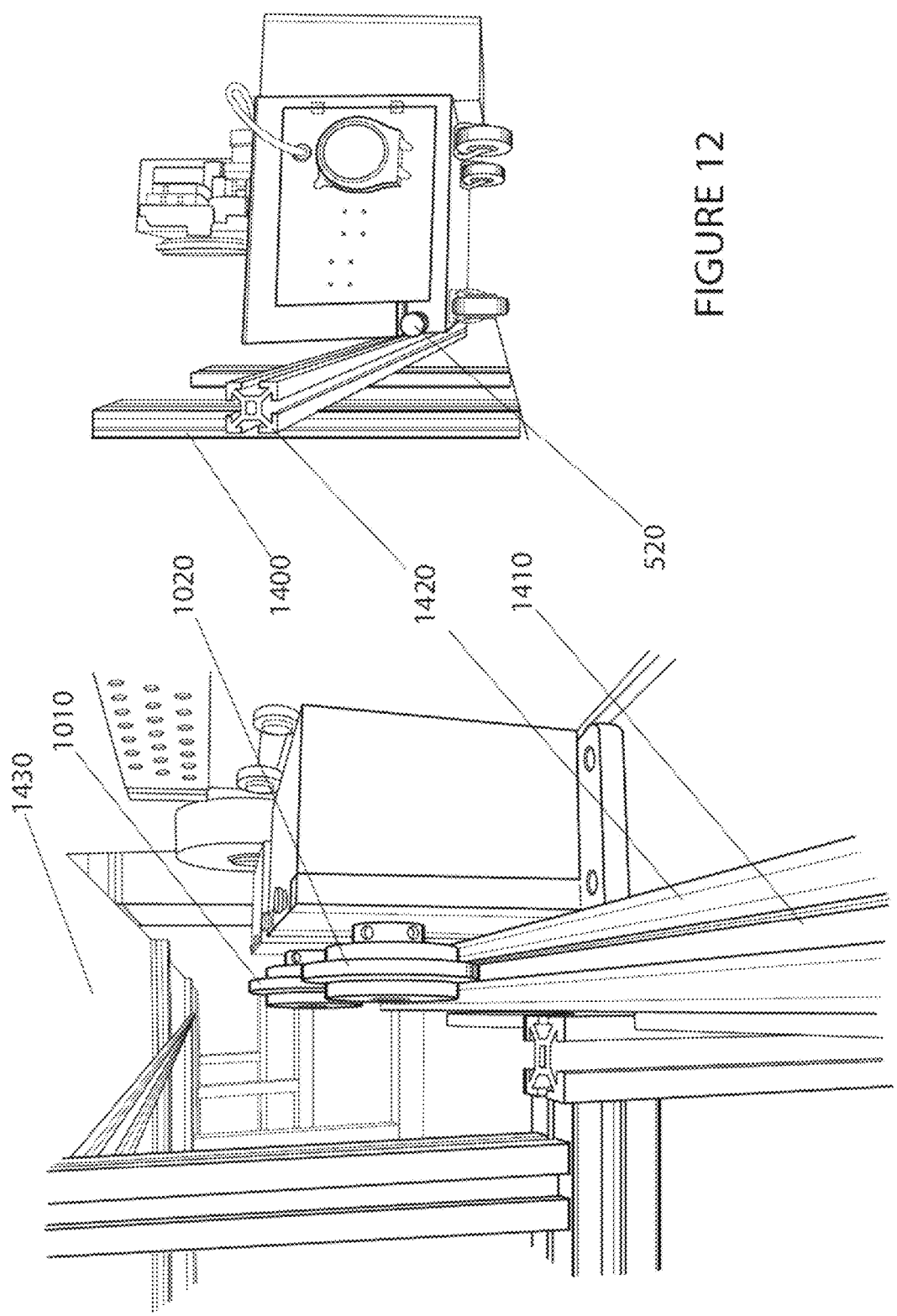
FIGS. 11 and 12 are example views of a track and other features in accordance with aspects of the disclosure.

Turning to FIGS. 10A-10C, the cart drive assembly 1000 is arranged on one side of the cart 500. The cart drive assembly includes a pair of wheels 1010, 1020, As shown in FIG. 11. the pair of wheels may be configured to ride within a groove 1410 of a track 1420 mounted below a table top 1430 of the table 1600. Returning to FIGS. 10A-10C, the rotation of each wheel 1010, 1020 is controlled by a respective motor 1030, 1040. The motors 1030, 1040 may be small electric motors or any motor configured to control the speed of the cart 500 relative to the table, for instance using gear drives housed in housings 1032, 1042, respectively. Having multiple wheels and multiple motors may provide for better speed control and reduces slippage of the wheels as compared to a single wheel and single motor configuration. In addition, one or both wheels may include a rotary encoder 1050 to provide a position of the cart relative to an end of the table. In addition, the motors 1030 and 1040 may each include a rotary encoder. By using two (i,e, at least one on a wheel and at least one on a motor or one on each of the wheels 1010, 1020) or more rotary encoders, the control assembly may more readily detect if one of the wheels is slipping.

Figure 13A:
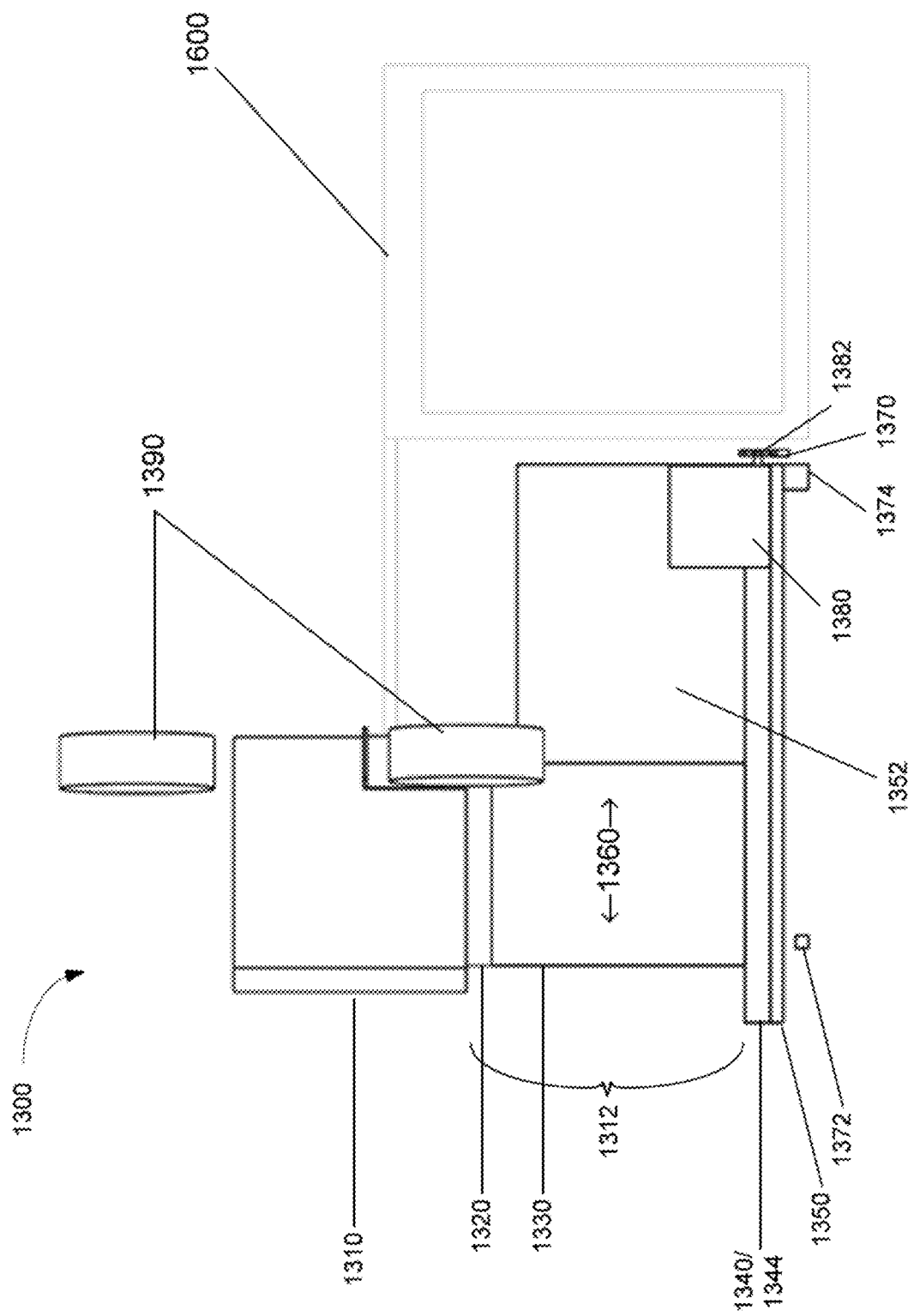
FIGS. 13A-C are example views of aspects of a heat sealing system in accordance with aspects of the disclosure.
Figure 13B:
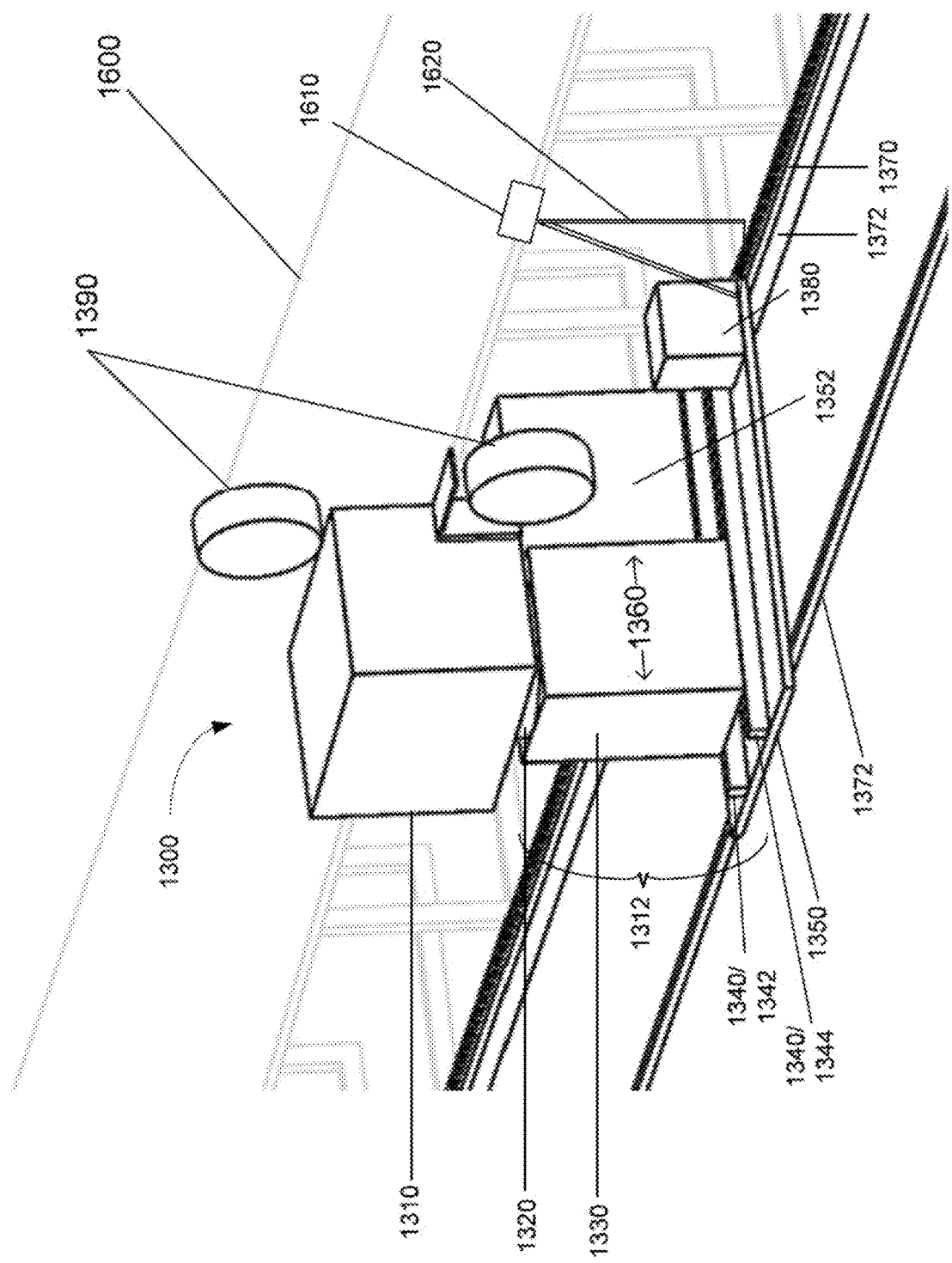
Figure 13C:
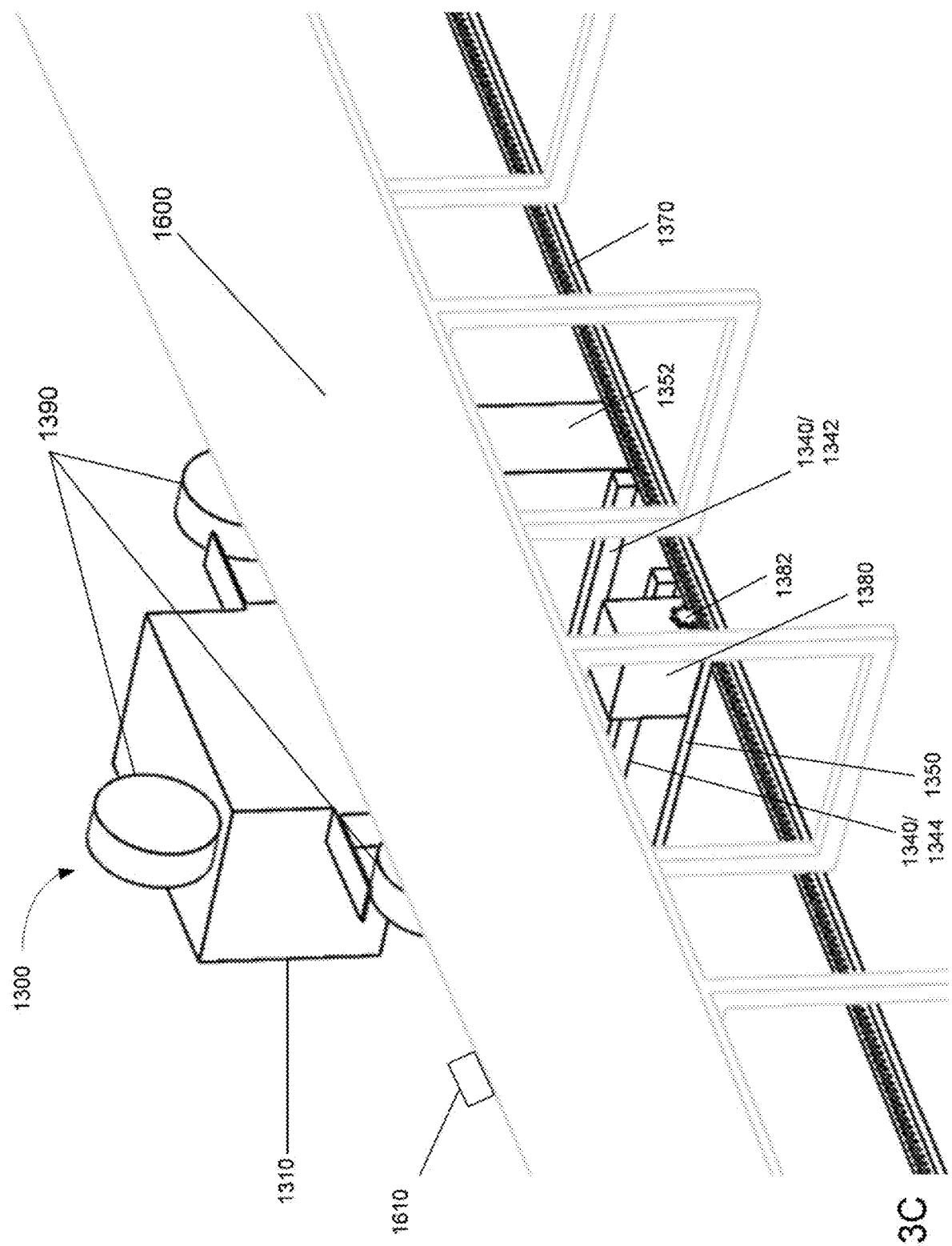

FIG. 13A-13C provide various views of aspects of an example heat sealing system 1300. As with the heat sealing system 400, the heat sealing system 1300 may include a sealer system, inlet assembly, outlet assembly and sealer assembly represented by box 1310. These features may be configured the same as or similarly to an inlet assembly 600, an outlet assembly 700, and a sealer assembly 800. The heat sealing system 1300 may also include a control assembly, a vision system and a marking system discussed further below. The heat sealing system 1300 may also include a table 1600, depicted in FIG. 16.

The box 1310 may be mounted to a positioning assembly 1312 similar to positioning assembly 900. The positioning assembly includes a rotatable platform 1320 attached to a motor housing 1330 including a motor (not shown). The motor housing is arranged on a linear stage 1340 including a pair of rails 1342, 1344 which are further mounted on a base platform 1350. The platform 1320 may be rotatable relative to the motor housing 1330, linear stage 1340 and base platform 1350 via the motor. In addition, the motor housing 1330 may be configured to move along the rails 1342, 1344 of linear stage 1340 in two directions, for instance, forward and reverse along the rails of the linear stage as indicated by arrow 1360 (shown in FIGS. 13A and 13B). The movement of the motor housing may be achieved similarly to the movement of the platform 910 as described above in this regard features corresponding to the carriage 950, motor 952, shaft 954 and spiral groove 956 may be enclosed within the motor housing 1330. Rotation of the shaft in a clockwise direction moves the motor housing 1330 along the rails in the first direction, and rotation of the shaft in a counterclockwise direction moves the motor housing along the rails in the second direction opposite of the first direction. The base platform 1350 may be arranged to support the drive assembly and various other systems of the heat sealer assembly, including for instance, an electrical housing 1352. This electrical housing may include, for instance, an air compressor, chiller components, a control assembly, etc. Alternatively, these components may be mounted to the platform in a similar arrangement as with the cart 500.

Rather than being arranged on a cart as with the heat sealing system 400, the heat sealing system 1300 may ride on a floor-mounted track 1370 (for instance, a bearing rail) and guiderail 1372. The heat sealing system 1300 may connect with the track 1370 and guide rails 1372, 1374 via a bearing system or other connection. The heat sealing system 1300 may be configured to move along the track and guide rails in order to move relative to a table 1600. For instance, a second motor housing 1380 is also mounted to the base platform 1350. The second motor mays be a rack and pinion, belt or cable drive, linear motor, friction drive or other configuration that can move a drive member, here depicted as a cog 1382, along teeth of the track 1370. Alternatively, the second motor may be located elsewhere and used to drive a portion of the track in order to move the heat sealing system 1300 relative to the table.

The heat sealing systems may also include other features. For instance, the heat sealing system 1300 may include a plurality of spools 1390 for laying down additional strips of material when heat sealing. For instance, these spools may be used to lay down strips of 2 inches or more or less of additional envelope material to increase the strength of heat seals. In addition or alternatively, these spools may be used to lay down a sleeve of additional envelope material within which the tendons of the balloon may be placed. Although depicted as disconnected from the motor housing 1310 for simplicity, the spools may actually be attached to the motor housing via brackets or other hardware. Although not depicted, the same or similar spools may also be incorporated into the heat sealing system 1300.

Figure 15:
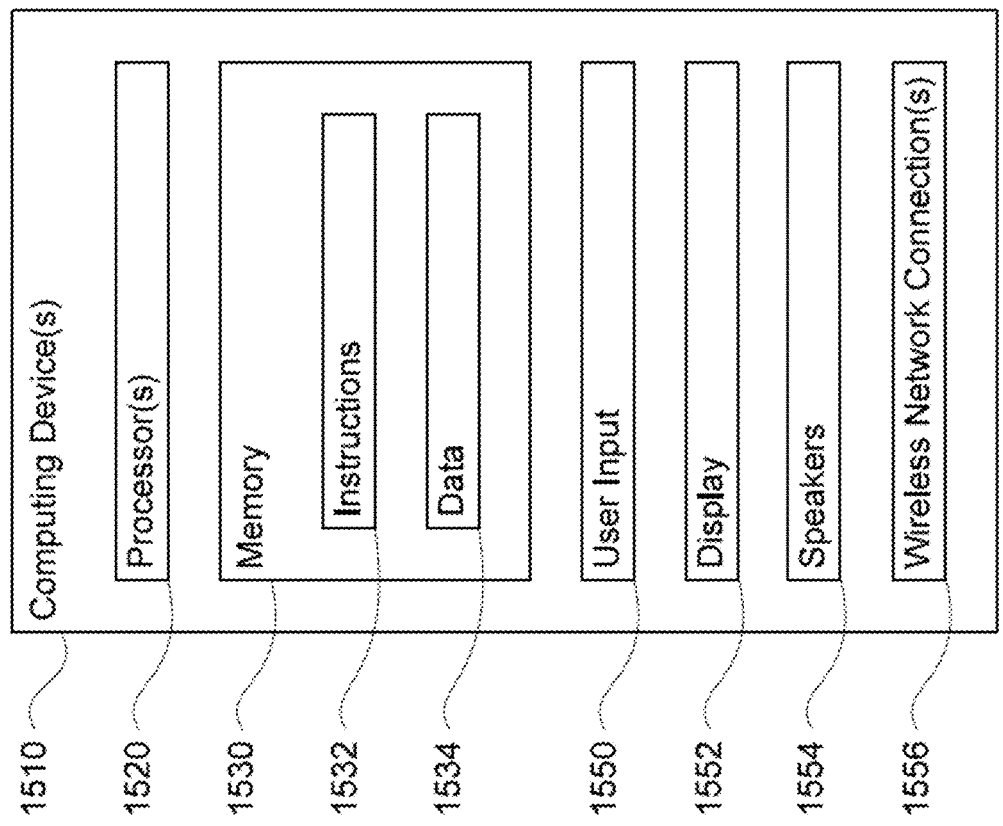
FIG. 15 is an example block diagram of a control assembly in accordance with aspects of the disclosure.

As another example, the heat sealing systems may include features such as a chair for an operator, additional equipment for handling the envelope material, a spool for dispensing sheets of envelope material (as opposed to the narrow strips provided by the spools), etc. For instance, as shown in FIGS. 13B and C, roller, bar, or guide 1610 may be attached to the platform 1350 via a support structure 1620 in order to control film in front of or in between heat sealing system 1300 and the table 1600, Turning to FIG. 15, the control assembly 1500 of the heat sealing system 400 or 1300 may include one or more computing devices 1510 having one or more processors 1520 and memory 1530 storing data 1532 and instructions 1534. The control assembly may also include a display 1552 and one or more user input devices 1550 (such as buttons or a touch sensitive display), speakers 1554. and one or more wireless network connections 1556.

The memory 1530 stores information accessible by the one or more processors 1520, including instructions 1534 and data 152 that may be executed or otherwise used by the processors 1520. The memory 1530 may be of any type capable of storing information accessible by the processors, including a computing device-readable medium, or other medium that stores data that may be read with the aid of an electronic device, such as a hard-drive, memory card, ROM, RAM. IVT) or other optical disks, as well as other write-capable and read-only memories. Systems and methods may include different combinations of the foregoing, whereby different portions of the instructions and data are stored on different types of media.

The instructions 1534 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 1532 may be retrieved, stored or modified by processors 1520 in accordance with the instructions 1534. For instance, although the claimed subject matter is not limited by any particular data structure, the data may be stored in computing device registers, in a relational database as a table having a plurality of different fields and records. XML documents or flat files. The data may also be formatted in any computing device-readable format.

The processors 1520 may be any one or more conventional processors, such as commercially available CPUs. Alternatively, the one or more processors may be a dedicated device such as an ASIC or other hardware-based processor. Although FIG. 15 functionally illustrates the processor, memory, and other elements of computing devices 1510 as being within the same block, it will be understood by those of ordinary skill in the art that the processor, computing device, or memory may actually include multiple processors, computing devices, or memories that may or may not be stored within the same physical housing. For example, memory 1530 may be a hard drive and/or other storage media located in housing different from that of computing device 1510. Accordingly, references to a processor or computing device will be understood to include references to a collection of processors or computing devices or memories that may or may not operate in parallel, Computing device 1510 may include all of the components normally used in connection with a computing device such as the processor and memory described above as well as one or more user input devices 1550 (e.g., a mouse, keyboard, touch screen and/or microphone) and various electronic displays (e.g., a monitor having a screen or any other electrical device that is operable to display information) In this example, the 15 control assembly 1500 includes one or more internal displays 1552. as well as one or more speakers 1554 to provide information or audio visual experiences. In this regard, display 1552 may be used to provide information human operators.

Computing device 1510 may also include one or more wireless network connections 1556 to facilitate communication with other computing devices, such as the encoders, thermometers, cameras, and various other sensors and features of the assemblies, systems, etc. discussed herein. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing.

The control assembly may 1500, for instance by way of the computing devices 1510, be configured to control various aspects of the heat sealing system, such as the speed and movement of the various motors. This, in turn, may allow the control assembly to control how the heat sealing system heat seals pieces of material. For instance, the control assembly may control how fast the cart 500 moves relative to the table 1600, the positions of the second heat sealing bars 830, 870, the first cooling bar 832, the speed (and in some cases the angle of) of various of the nip rollers and rollers, the orientation and/or position of the platform 910 relative to the linear stage 920 based on feedback from the aforementioned rotary encoders and thermometers.

Figure 16:
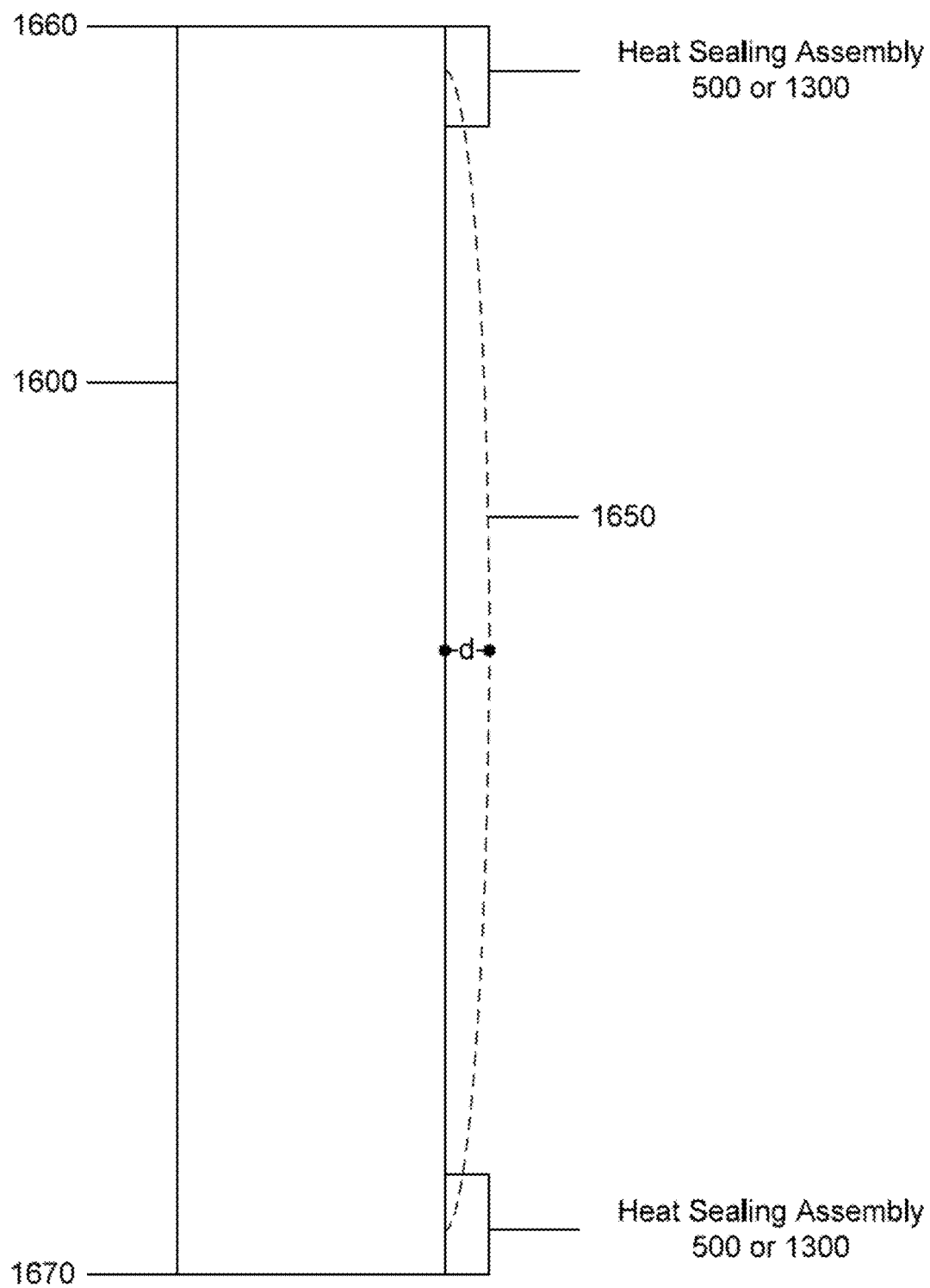
FIG. 16 is an example view of a table and a sealer assembly and cart in two different positions (i.e. at two different points in time) in accordance with aspects of the disclosure.

Turning to FIG. 16, as the heat sealing assembly 400 or 1300 moves along the table 1600, the control assembly 1500 may control the position of the linear stage 920 to move the platform 910 towards and away from the table 1600, This, in turn, may also cause the sealer assembly to move towards and away from the table. In addition, the rotation of the platform may cause the scaler assembly to move even further away from the table. In this example, as the cart moves from the first end of the table 1660 to the second end of the table 1670, the scaler assembly may actually follow the path of dashed line 1650 which may correspond to a desired curve for a balloon envelope gore. The distance d represents the amount of lateral movement with respect to the table possible. For example, the configuration depicted in the figures may allow for a value of d of up to 200 mm with respect to the table while the cart remains at the same relative lateral position with respect to the table as the cart is moved along the length of the table. In this regard, the curve shape of the envelope material resulting from the heat sealing (and in some instances, subsequent cutting) may follow up to 200 mm of travel away from the table. By adjusting the distance and speed at which the sealer assembly is moved away from and towards the table, the control assembly 1500 may change the shape of the heat sealed material, and accordingly, the shape of the resulting gore. In other words, the shape of the heat sealed material is independent of the shape of the table, but can be precisely controlled.

Figure 17:
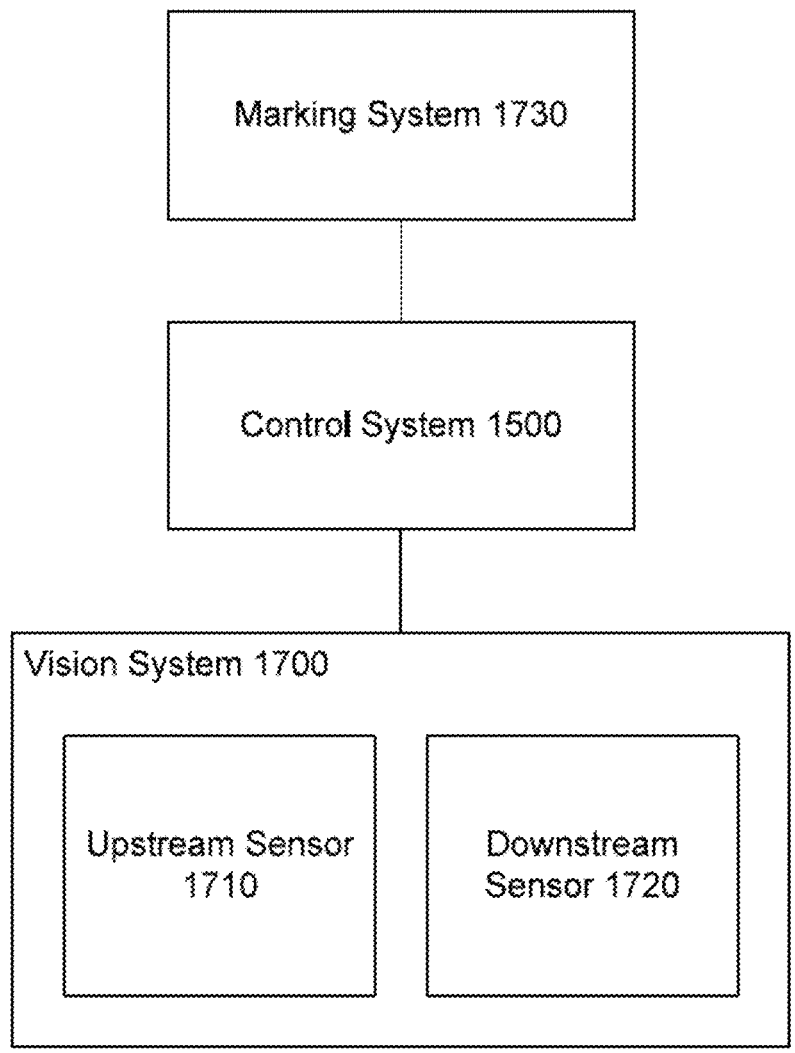
FIG. 17 is an example block diagram of a marking system, control assembly and vision system in accordance with aspects of the disclosure.

Turning to FIG. 17 heat sealing system 400 or 1300 may include a vision system 1300 in communication, for instance via wired or wireless connections 136, with the control assembly 1500. The vision system 1300 may provide for data collection by the control assembly 1500, For instance, a first upstream sensor 1710, may be positioned in order to monitor material tension and position ahead of the intake assembly. For example, the upstream sensor may be a camera arranged on the heat sealing system. to capture images of material 1 meter, or more or less, in front of the cart. This may allow the control assembly 1500 to monitor conditions proximate to the cart. Other cameras may be mounted above the table at different locations, for instance, on an overhead mounting system which can be used to monitor conditions at different points along the length of the table. The camera can be a typical video or still camera. In addition or alternatively, ultrasonic or LIDAR. devices, that can be used to detect differences in the height or thickness of the envelope material, may also be used. Data from the sensors may be processed by the control assembly in order to identify inconsistencies in tension, folds, creases, etc. For instance, contrast as well as different lighting and filtering techniques may be used to detect changes in the smoothness or flatness of the file and/or position.

The vision system 1700 may also include a second downstream sensor 1720. For instance, the downstream sensor may be positioned in order to record the heat seals behind the cart as the cart moves along the table. As such, the downstream sensor may include a camera, such as a typical video or still camera as well as a polarized. In addition or alternatively, the sensor may be an infrared camera. The light source may be located on the sealer assembly and may be positioned to shine through the seal and recorded by a camera on the opposite side. Each image captured by the camera may be associated with the position on the table for instance, using an encoder to determine the position. These images and associated position information may be sent to and received by the control assembly 1500. This may allow for comparisons between different pieces of materials (e.g. different gores). In addition or alternatively, the second downstream sensor may include a thermal camera. The thermal camera may capture images that allow the control assembly to measure changes in the heat gradient along the heat seal.

The heat sealing system 400 or 1300 may also include a marking system 1730 in communication, for instance via wired or wireless connections 1556, with the control assembly 1500. The marking system may be configured to mark the heat sealed material with information. For instance, the marking system may include a pen, marker, ink jet printer, or any other contact or non-contact device capable of marking information onto the heat sealed material while maintaining an even, consistent pressure during marking. The ink used to make the markings may be selected in order to be compatible with polyethylene film and not negatively impact the film during flights in the stratosphere for at least some period of time, such as 1 year or more or less. The markings may include text or other markings which can be used as a reference during manufacturing and/or in the event of a failure of a balloon during a flight. As such, the markings may be used as a reference to retrieve data from the control assembly about the circumstances of the manufacturing related to a point of failure on a balloon. In this regard, each marking may be configured as a code which can be used to identify when and under what circumstances the envelope material was heat sealed at the location of the marking.

The marking system 1530 may be configured to make the markings upstream of the sealer assembly and/or downstream of the sealer assembly. Downstream and upstream may have different benefits. For instance, downstream may allow the ink free to dry without potentially contacting something. Upstream may potentially better for film tension so there is a nice flat surface to print onto. As one example, the markings may be made at particular reference points on the table and/or at locations on the envelope material where secondary operations (such as applying tack points for launching purposes, folding locations, device attachment locations, etc.) are required.

The features described herein may allow for a more consistent process for manufacturing balloon envelope gores. In addition, because the sealer assembly is able to be moved relative to the table, the shape of balloon envelope gores is no longer limited to the shape of the table or the inconsistencies of manual heat sealing processes. This can improve film tension during sealing and quality of the final balloon envelope. In addition, the use of a vision system to monitor tension and seal quality may provide data which can be used to improve seal quality and identify potential causes of balloon envelope failures related to manufacturing conditions.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A heat sealing system comprising:
   a sealer assembly including a pair of heat sealing bars configured to generate heat seals;
   a positioning assembly including a rotatable platform movably mounted on at least one rail, wherein the sealer assembly is carried on the rotatable platform, and wherein said rotatably platform is configured to rotate the sealer assembly relative to a first axis, and wherein said rotatable platform is laterally movable along said at least one rail to move the sealer assembly along a second axis;
   an inlet assembly disposed adjacent said sealer assembly directing an envelope material into said sealer assembly, wherein said inlet assembly includes a series of inlet rollers configured to rotate and provide tension to said envelope material entering the sealer assembly; and,
   an outlet assembly disposed adjacent said sealer assembly on an opposite side from said inlet assembly, wherein said outlet assembly includes a series of outlet rollers configured to rotate and provide tension to said envelope material while pulling said envelope material away from the sealer assembly.

2. The system of claim 1, wherein said inlet assembly and said outlet assembly move together with said sealer assembly when the position of said sealer assembly is changed by said positioning assembly.

3. The system of claim 1, wherein said outlet assembly includes a rotary cutting blade configured to cut excess envelope material exiting said sealer assembly.

4. The system of claim 3, wherein said series of outlet rollers includes at least one outlet roller configured to pull excess envelope material into a waste receptacle.

5. The system of claim 1, further comprising a cart on which the positioning assembly is mounted, the cart being configured to move along the edge of the table.

6. The system of claim 5, wherein the cart includes a plurality of wheels that allow the cart to move relative to the table and a side roller which allows the cart to maintain a relative distance from the edge of the table while the cart is moved along the edge of the table.

7. The system of claim 1, further comprising a cart and a cart drive assembly attached to the cart, the cart drive assembly including one or more motors configured to move the cart along the edge of the table.

8. The system of claim 7, wherein the cart drive assembly includes one or more wheels driven by a respective one of the one or more motors, the one or more wheels being configured to sit in a groove of a track of the table in order to move the cart along the edge of the table.

9. The system of claim 8, wherein the cart includes a side roller configured to maintain a relative position of the one or more wheels in the track in order to reduce wear on the one or more wheels.

10. The system of claim 8, wherein one of the one or more wheels includes a rotary encoder configured to provide rotation information for the one of the one or more wheels.

11. The system of claim 10, further comprising a control assembly including one or more computing devices configured to receive the rotation information and determine whether a wheel of the one or more wheels is slipping.

12. The system of claim 7, wherein the one or more motors are configured to control speed of the cart relative to the edge of the table as the cart is moved along the edge of the table.

13. The system of claim 7, further comprising a control assembly having one or more computing devices configured to control the sealer assembly and speed of the cart.

14. The system of claim 7, further comprising a control assembly having one or more computing devices configured to control position of the platform relative to the cart and the table.

15. The system of claim 1, further comprising a vision system including one or more sensors positioned in order to capture images of material on the table upstream from the sealer assembly.

16. The system of claim 15, further comprising a control assembly including one or more computing devices configured to use the images to detect problems with envelope material prior to the envelope material being heat sealed.

17. The system of claim 15, wherein the vision system includes one or more sensors positioned in order to capture images of heat seals on the table downstream from the sealer assembly.

18. The system of claim 1, further comprising a marking system configured to use ink to mark material with identifying information.

19. The system of claim 1 wherein said series of inlet rollers include a first pair of rollers and a second pair of rollers, wherein each roller of the first and second pairs of rollers is vertically aligned along a common plane for each pair of rollers, and wherein at least one roller in each of the first and second pairs of rollers being motor driven to control movement of the envelope material into the sealer assembly.

20. The system of claim 19 wherein said first pair of rollers is laterally spaced from said second paid of rollers along a common plane, and wherein at least one of said first and second pairs of rollers is movably long said common plane towards and away from the sealer assembly to change an angle of the envelope material entering the sealer assembly.

* * * * *